(12) United States Patent
    Wang et al.

(10) Patent No.: US 9,210,614 B2
(45) Date of Patent: Dec. 8, 2015

(54) WIRELESS LOCAL AREA NETWORK COORDINATED DATA TRANSMISSION METHOD, DEVICE, AND SYSTEM

(71) Applicant: Huawei Technologies Co., Ltd., Shenzhen (CN)

(72) Inventors: Rui Wang, Shenzhen (CN); Yinggang Du, Shenzhen (CN); Hong Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 206 days.

(21) Appl. No.: 14/165,138

(22) Filed: Jan. 27, 2014

(65) Prior Publication Data

US 2014/0140335 A1    May 22, 2014

Related U.S. Application Data

(63) Continuation of application No. PCT/CN2011/077605, filed on Jul. 26, 2011.

(51) Int. Cl.
    *H04W 28/08*    (2009.01)
    *H04W 8/08*    (2009.01)
    (Continued)

(52) U.S. Cl.
    CPC .............. *H04W 28/08* (2013.01); *H04W 8/08* (2013.01); *H04W 84/12* (2013.01); *H04W 80/02* (2013.01)

(58) Field of Classification Search
    USPC ........................................................ 370/338
    See application file for complete search history.

(56) References Cited

U.S. PATENT DOCUMENTS 6,711,126 B1 *   3/2004   Besset-Bathias   H04L 2012/5648
                                              370/229
2005/0265390 A1 * 12/2005  Lee .................... H04W 28/06
                                              370/469

(Continued)

FOREIGN PATENT DOCUMENTS

CN        101895929 A     11/2010
CN        101945435 A      1/2011

(Continued)

OTHER PUBLICATIONS

LTE, "3$^{rd}$ Generation Partnership Project; Technical Specification Group Services and System Aspects; IP flow mobility and seamless Wireless Local Area Network(WLAN) offload" Stage 2 (Release 10) 3GPP TS 23.261, V10.1.0, Sep. 2010, 22 pages.

*Primary Examiner* — Phuongchau Ba Nguyen
(74) *Attorney, Agent, or Firm* — Brinks Gilson & Lione

(57) ABSTRACT

A WLAN coordinated data transmission method, system, and relevant device are disclosed. The WLAN coordinated data transmission method includes: detecting, by an offloading scheduling controller, whether the number of MAC SDUs buffered in a MAC SDU queue of a mobile communication module exceeds a preset threshold, and, if so, packing a part of the MAC SDUs into a MAC PDU, and sending the MAC PDU to a coordination mode management module through an interface of the mobile communication module; sending, by the coordination mode management module, the MAC PDU containing the packed part of the MAC SDUs through an LLC protocol layer to a WLAN module for transmission; and packing, by the offloading scheduling controller, a remaining part of the MAC SDUs buffered in the MAC SDU queue into a MAC PDU, and transmitting the MAC PDU through the mobile communication module.

18 Claims, 10 Drawing Sheets

(51) Int. Cl.
*H04W 84/12* (2009.01)
*H04W 80/02* (2009.01)

(56) References Cited

U.S. PATENT DOCUMENTS

| | | | | |
|---|---|---|---|---|
| 2006/0002416 | A1* | 1/2006 | Yagihashi | H04L 1/1835 370/428 |
| 2007/0206529 | A1 | 9/2007 | Liu et al. | |
| 2008/0188224 | A1* | 8/2008 | Pani | H04W 36/0005 455/436 |
| 2008/0219195 | A1* | 9/2008 | Pani | H04L 69/324 370/310 |
| 2009/0080369 | A1* | 3/2009 | Uminski | H04W 72/1263 370/328 |
| 2009/0086708 | A1* | 4/2009 | Pani | H04W 28/065 370/349 |
| 2009/0092202 | A1* | 4/2009 | Kim | H04L 1/1887 375/295 |
| 2009/0147750 | A1 | 6/2009 | Schindler et al. | |
| 2009/0245166 | A1* | 10/2009 | Okuda | H04L 12/4633 370/315 |
| 2009/0274104 | A1 | 11/2009 | Addy | |
| 2010/0016022 | A1 | 1/2010 | Liu et al. | |
| 2010/0296487 | A1 | 11/2010 | Karaoguz et al. | |
| 2010/0296497 | A1 | 11/2010 | Karaoguz et al. | |
| 2010/0296498 | A1 | 11/2010 | Karaoguz et al. | |
| 2010/0296499 | A1 | 11/2010 | Karaoguz et al. | |
| 2012/0002610 | A1* | 1/2012 | Widegren | H04W 52/12 370/328 |

FOREIGN PATENT DOCUMENTS

| | | | |
|---|---|---|---|
| CN | 102026411 A | 4/2011 | |
| EP | 2254382 A2 | 11/2010 | |
| EP | 002725825 A1 * | 7/2011 | H04W 4/04 |
| WO | WO 2005/039127 A1 | 4/2005 | |
| WO | WO 2011/028954 A1 | 3/2011 | |

* cited by examiner

WIRELESS LOCAL AREA NETWORK COORDINATED DATA TRANSMISSION METHOD, DEVICE, AND SYSTEM

CROSS-REFERENCE TO RELATED APPLICATIONS

This application is a continuation of International Application No. PCT/CN2011/077605, filed on Jul. 26, 2011, which is hereby incorporated by reference in its entirety.

TECHNICAL FIELD

The present invention relates to the mobile communication field, and in particular, to a wireless local area network coordinated data transmission method, device, and system.

BACKGROUND

A Femtocell (Femtocell) is generally deployed indoors and in shopping malls to eliminate blind spots and shadow regions that can be hardly covered by signals in such occasions. The wireless transmission manner of the Femtocell may be, but is not limited to, high-speed packet access (High-Speed Packet Access, HSPA), high-speed packet access evolution (High-Speed Packet Access Evolution, HSPA+), or long term evolution (Long Term Evolution, LTE). A main device for the Femtocell to implement wireless transmission is a mobile communication module. In practical applications, the density of deployed Femtocells is generally high. For example, the Femtocells are densely deployed in residential areas or shopping malls, causing great interference between the Femtocells. Currently, to solve the interference between the Femtocells, the radio spectrum used by each Femtocell is staggered as much as possible. Therefore, the limited radio spectrum is split into multiple frequency bands, and the frequency band used by each Femtocell is rather limited, which drastically limits throughput of indoor users.

A wireless local area network (Wireless Local Area Network, WLAN) is an indoor wireless communication system that is popularized currently, and is characterized by support of mobile computing, high confidentiality, high resistance against interference, fast networking, convenient maintenance, and so on. Main wireless transmission manners of the WLAN include radio wave manners (including a spread spectrum manner and a narrowband modulation manner) and an infrared manner. A main device for the WLAN to implement wireless transmission is a WLAN module. In an indoor environment, as a supplement to a wired local area network (Local Area Network, LAN), the WLAN coexists with the wired LAN, and is applicable to environments such as large offices, exhibitions, temporary offices, meeting rooms, and securities markets.

In practice, it is found that in many indoor occasions, a WLAN is deployed in addition to a Femtocell. However, when a Femtocell base station (whose main device is a mobile communication module) or a mobile station (whose main device is a mobile communication module) sends data, the data can be sent through Femtocell resources only. When the FBS and the mobile station need to send a large amount of data, the air interface transmission delay of the system will increase.

SUMMARY

Embodiments of the present invention provide a wireless local area network coordinated data transmission method, device, and system, which can shorten the air interface transmission delay of a system.

A wireless local area network coordinated data transmission method includes:
  detecting, by an offloading scheduling controller, whether the number of MAC SDUs buffered in a medium access control service data unit MAC SDU queue of a mobile communication module exceeds a preset threshold, and, if so, packing a part of the MAC SDUs into a medium access control protocol data unit MAC PDU, and sending the MAC SDU to a coordination mode management module through an interface of the mobile communication module;
  sending, by the coordination mode management module, the MAC PDU containing the packed part of the MAC SDUs through a logical link control LLC function entity to a wireless local area network access point WLAN module for transmission; and
  packing, by the offloading scheduling controller, a remaining part of the MAC SDUs buffered in the MAC SDU queue into a MAC PDU, and transmitting the MAC PDU through the mobile communication module.

A wireless local area network coordinated data transmission device includes:
  an offloading scheduling controller, a mobile communication module, a coordination mode management module, an LLC function entity, and a WLAN module, where:
  the offloading scheduling controller is adapted to detect whether the number of MAC SDUs buffered in a MAC SDU queue of the mobile communication module exceeds a preset threshold, and, if so, pack a part of the MAC SDUs into a MAC PDU, and send the MAC PDU to the coordination mode management module through an interface of the mobile communication module;
  the coordination mode management module is adapted to receive the MAC PDU containing the packed part of the MAC SDUs, and send the MAC PDU to the LLC function entity;
  the LLC function entity is adapted to receive the MAC PDU sent by the coordination mode management module, and send the MAC PDU to the WLAN module for transmission; and
  the offloading scheduling controller is further adapted to pack a remaining part of the MAC SDUs buffered in the MAC SDU queue into a MAC PDU, and transmit the MAC PDU through the mobile communication module.

A wireless local area network coordinated data transmission system includes a base station and a mobile station, where:
  the base station includes a first offloading scheduling controller, a first mobile communication module, a first coordination mode management module, a first LLC function entity, and a first WLAN module;
  the first offloading scheduling controller is adapted to detect whether the number of MAC SDUs buffered in a MAC SDU queue of the first mobile communication module exceeds a preset threshold, and, if so, pack a part of the MAC SDUs into a MAC PDU, and send the MAC PDU to the first coordination mode management module through an interface of the first mobile communication module; the first coordination mode management module is adapted to receive the MAC PDU containing the packed part of the MAC SDUs, and send the MAC PDU to the first LLC function entity; the first LLC function entity is adapted to receive the MAC PDU sent by the first coordination mode management module, and send the MAC PDU to the first WLAN module; the first WLAN module is adapted to transmit the MAC PDU, which is sent by the first LLC function entity, to the mobile station; and the first offloading scheduling controller is further adapted to pack a remaining part of the MAC SDUs buffered in the MAC SDU queue into a MAC PDU, and transmit the MAC PDU to the mobile station through the first mobile communication module;

the mobile station includes a second mobile communication module, a second coordination mode management module, a second LLC function entity, and a second WLAN module;

the second WLAN module is adapted to receive the MAC PDU transmitted by the first WLAN module, and send the MAC PDU to the second LLC function entity; the second LLC function entity is adapted to receive the MAC PDU sent by the second WLAN module, and send the MAC PDU to the second coordination mode management module; and the second coordination mode management module is adapted to receive the MAC PDU sent by the second LLC function entity, and send the MAC PDU to a MAC PDU queue of the second mobile communication module through an interface of the second mobile communication module, where the MAC PDU sent by the second coordination mode management module is aggregated with a MAC PDU received by the second mobile communication module in the MAC PDU queue of the second mobile communication module.

In the embodiments of the present invention, an offloading scheduling controller detects whether the number of MAC SDUs buffered in a MAC SDU queue of a mobile communication module exceeds a preset threshold, and, if so, packs a part of the MAC SDUs into a MAC PDU, and sends the MAC PDU to a coordination mode management module through an interface of the mobile communication module; the coordination mode management module sends the MAC PDU containing the packed part of the MAC SDUs through an LLC function entity to a WLAN module for transmission; and the offloading scheduling controller further packs a remaining part of the MAC SDUs buffered in the MAC SDU queue into a MAC PDU, and transmits the MAC PDU through the mobile communication module. As can be seen, the embodiments of the present invention implement data offloading scheduling at a MAC layer of the mobile communication module of the Femtocell base station or the mobile station, and therefore, when the Femtocell base station and the mobile station need to send data, the data may be sent through the WLAN module and the mobile communication module. That is to say, the data that needs to be sent by the Femtocell base station and the mobile station may be sent through WLAN resources and Femtocell resources. Compared with the prior art which sends data through Femtocell resources only, the embodiments of the present invention can shorten the air interface transmission delay of a system and improve communication experience of mobile communication users.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiment of the present invention without creative efforts shall fall within the protection scope of the present invention.

The embodiments of the present invention provide a WLAN coordinated data transmission method, device, and system, which can shorten the air interface transmission delay of a system and improve communication experience of mobile communication users, as detailed below.

Figure 1:
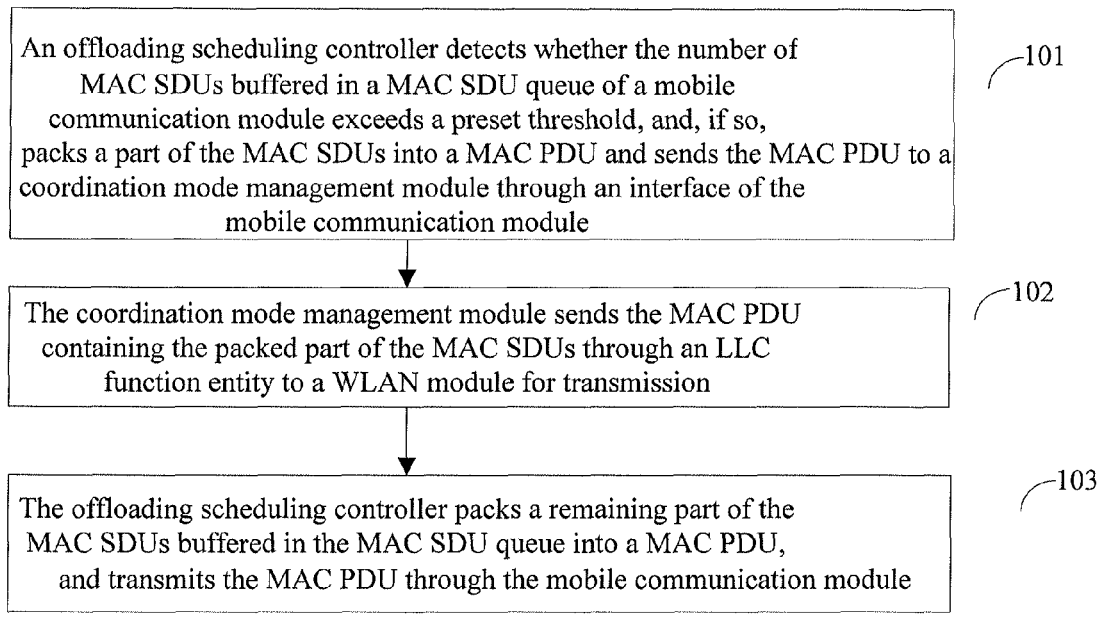
FIG. 1 is a schematic flowchart of a WLAN coordinated data transmission method according to an embodiment of the present invention.

Reference is made to FIG. 1, which is a schematic flowchart of a WLAN coordinated data transmission method according to an embodiment of the present invention. The data transmission method may include the following steps:

101. An offloading scheduling controller detects whether the number of MAC SDUs (Medium Access Control Service Data Unit, MAC SDU) buffered in a medium access control service data unit queue of a mobile communication module exceeds a preset threshold, and, if so, packs a part of the MAC SDUs into a medium access control protocol data unit (Medium Access Control Protocol Data Unit, MAC PDU), and sends the MAC PDU to a coordination mode management module through an interface of the mobile communication module.

If it is detected that the number of MAC SDUs buffered in the MAC SDU queue of the mobile communication module does not exceed the preset threshold, the offloading scheduling controller may continue detecting.

In the embodiment of the present invention, the mobile communication module includes but is not limited to an FBS that supports LTE, HSPA, and HSPA+ mobile communication protocols.

In an embodiment, after detecting that the number of MAC SDUs buffered in the MAC SDU queue exceeds the preset threshold, the offloading scheduling controller may aggregate several MAC SDUs buffered at the end of the MAC SDU queue into a MAC PDU. The detailed implementation process of aggregating several MAC SDUs into a MAC PDU is well known to persons skilled in the art, and will not be detailed in the embodiment of the present invention.

102. The coordination mode management module sends the MAC PDU containing the packed part of the MAC SDUs through a logical link control (Logical Link Control, LLC) function entity to a wireless local area network (WLAN) module for transmission.

The detailed implementation process of transmitting data by the WLAN module is the same as that in the prior art, and is well known to persons skilled in the art and will not be detailed in the embodiment of the present invention.

103. The offloading scheduling controller packs a remaining part of the MAC SDUs buffered in the MAC SDU queue into a MAC PDU, and transmits the MAC PDU through the mobile communication module.

The detailed implementation process of transmitting data through the mobile communication module is well known to persons skilled in the art, and will not be detailed in the embodiment of the present invention.

The embodiment of the present invention can implement data offloading scheduling at a MAC layer of a mobile communication module, and therefore, when a Femtocell base station and a mobile station need to send data, the data may be sent through a WLAN module and the mobile communication module. That is to say, the data that needs to be sent by the Femtocell base station and the mobile station may be sent through WLAN resources and Femtocell resources. Compared with the prior art which sends data through Femtocell resources only, the embodiment of the present invention can shorten the air interface transmission delay of a system and improve communication experience of mobile communication users.

To implement WLAN coordinated transmission, the embodiment of the present invention requires the Femtocell base station and the mobile station to support both a mobile communication protocol (such as LTE, HSPA, or HSPA+) and a WLAN protocol. That is to say, the Femtocell base station and the mobile station need to support both the mobile communication module and the WLAN module. When the Femtocell base station and the mobile station do not need to perform WLAN coordinated transmission, the mobile communication module and the WLAN module may run independently to support those Femtocell base stations and mobile stations that do not support WLAN coordinated transmission. For example, the mobile communication module may provide a mobile communication service for an upper layer independently, and the WLAN module may also provide a communication service for a TCP/IP protocol layer independently.

In an embodiment, if a Femtocell base station supports both a mobile communication module and a WLAN module and needs to perform WLAN coordinated transmission, the WLAN coordinated data transmission method provided in the embodiment of the present invention may further include the following steps:

A1. A coordination mode configuration server obtains a cell identifier ID of a Femtocell from the mobile communication module, and sets an SSID (Service Set Identifier, SSID) of a WLAN AP according to a mapping relationship from the cell identifier ID to the service set identifier.

B1. The coordination mode configuration server performs WLAN coordinated transmission right authentication with a coordination mode configuration client on a mobile station through the WLAN module; and, if the mobile station has rights of WLAN coordinated transmission, the coordination mode configuration server notifies a coordination mode management module and the mobile communication module of starting WLAN coordinated transmission.

Through the above steps A1 and B1, the coordination mode configuration server can start the WLAN coordinated transmission on a base station, and further implement data offloading scheduling at a MAC layer of the mobile communication module. Therefore, when a Femtocell base station needs to send data, the data may be sent through the WLAN module and the mobile communication module, that is, sent through WLAN resources and Femtocell resources. Thereby the air interface transmission delay of a system can be shortened and communication experience of mobile communication users can be improved.

In an embodiment, if a mobile station supports both a mobile communication module and a WLAN module and needs to perform WLAN coordinated transmission, the WLAN coordinated data transmission method provided in the embodiment of the present invention may further include the following steps:

A2. A coordination mode configuration client obtains a cell identifier ID of a Femtocell from the mobile communication module, and obtains an SSID of a wireless local area network access point WLAN AP according to a mapping relationship from the cell identifier ID to the service set identifier SSID, where the obtained SSID is denoted by SSID1.

B2. The coordination mode configuration client searches for WLAN APs through the WLAN module and obtains a list of SSIDs of accessible WLAN APs, and searches the list of SSIDs to check whether the SSID1 is existent, and, if existent, triggers the WLAN module to connect to a WLAN AP corresponding to the SSID1.

C2. The coordination mode configuration client performs WLAN coordinated transmission right authentication with a coordination mode configuration server on a base station through the WLAN module; and, if the base station has rights of WLAN coordinated transmission, the coordination mode configuration client notifies a coordination mode management module and the mobile communication module of starting WLAN coordinated transmission.

Through the above steps A2 to C2, the coordination mode configuration client can start the WLAN coordinated transmission on a mobile station, and further implement data offloading scheduling at a MAC layer of the mobile communication module. Therefore, when a mobile station needs to send data, the data may be sent through the WLAN module and the mobile communication module, that is, sent through WLAN resources and Femtocell resources. Thereby the air interface transmission delay of a system can be shortened and communication experience of mobile communication users can be improved.

In an embodiment, if a base station and a mobile station support both a mobile communication module and a WLAN module and need to perform WLAN coordinated transmission, the WLAN coordinated data transmission method provided in the embodiment of the present invention may further include the following steps:

A3. The WLAN module receives a MAC PDU input from the outside, and sends the MAC PDU to a coordination mode management module through an LLC function entity.

B3. The coordination mode management module receives the MAC PDU sent by the LLC function entity, and sends the MAC PDU to a MAC PDU queue of the mobile communication module through an interface of the mobile communication module, so that the MAC PDU sent by the coordination mode management module is aggregated with a MAC PDU received by the mobile communication module in the MAC PDU queue of the mobile communication module.

Through the above steps A3 and B3, the embodiment of the present invention can receive data in a WLAN coordination mode, which also can fulfill the purposes of shortening the air interface transmission delay of a system and improving communication experience of mobile communication users.

In an embodiment, if a base station and a mobile station support both a mobile communication module and a WLAN module and need to perform WLAN coordinated transmission, the WLAN coordinated data transmission method provided in the embodiment of the present invention may further include the following steps:

Before sending the MAC PDU containing the packed part of the MAC SDUs through an LLC function entity to a WLAN module for transmission, the coordination mode management module may store the MAC PDU containing the packed part of the MAC SDUs into a WLAN coordination mode dedicated memory entity.

Correspondingly, the coordination mode management module may further receive a MAC layer command sent by the mobile communication module as an instruction for canceling coordinated transmission of the part of MAC PDUs stored in the WLAN coordination mode dedicated memory entity; and, according to the MAC layer command, the coordination mode management module may cancel sending of the part of MAC PDUs stored in the WLAN coordination mode dedicated memory entity through the LLC function entity to the WLAN AP function module for transmission. Thereby controllability of WLAN coordinated transmission can be improved.

In an embodiment, the MAC SDUs buffered in the MAC SDU queue may be generated by an LTE MAC layer function entity in an LTE Femtocell, or generated by a MAC-hs function entity in an HSPA Femtocell, which is not limited in the embodiment of the present invention.

To enhance comprehensibility of the WLAN coordinated data transmission method provided in the embodiment of the present invention and clarify advantages of the present invention over the prior art, the following describes the present invention with reference to specific embodiments.

Embodiment 1

Figure 2:
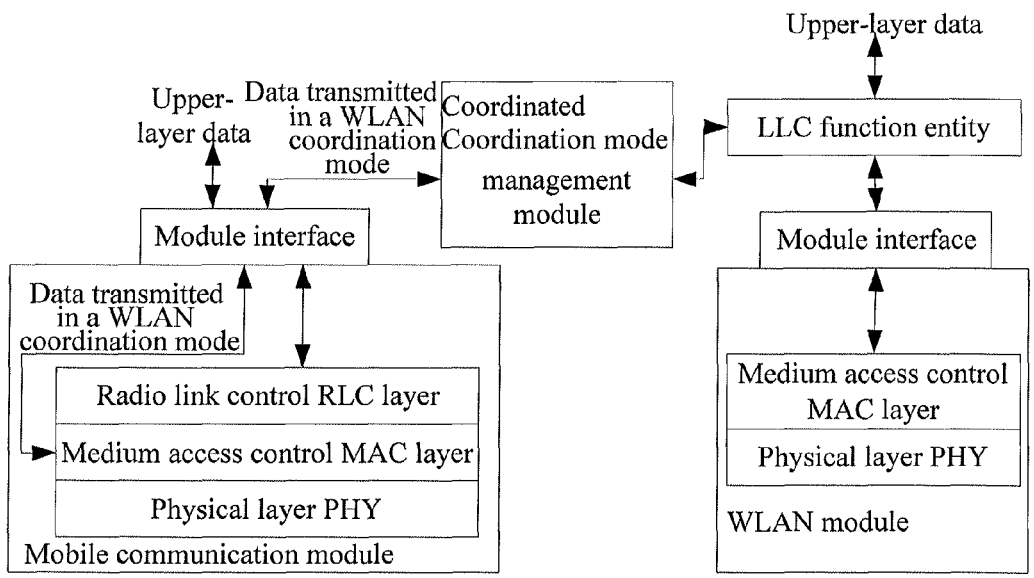
FIG. 2 is a logic diagram of a base station or a mobile station in a WLAN coordination mode according to an embodiment of the present invention.

Reference is made to FIG. 2, which is a logic diagram of a base station or a mobile station in a WLAN coordination mode according to an embodiment of the present invention.

As shown in FIG. 2, the base station or mobile station may transmit data in a WLAN coordination mode (that is, the base station or mobile station serves as a transmitter). In this case, an offloading scheduling controller detects whether the number of MAC SDUs buffered in a MAC SDU queue in a MAC layer of a mobile communication module exceeds a preset threshold, and, if so, packs a part of the MAC SDUs into a MAC PDU, and sends the MAC PDU to a coordination mode management module through an interface of the mobile communication module; the coordination mode management module sends the MAC PDU containing the packed part of the MAC SDUs through an LLC function entity to a WLAN module for transmission, that is, for transmission through a MAC layer and a physical layer (PHY) of the WLAN module; and the offloading scheduling controller may pack a remaining part of the MAC SDUs buffered in the MAC SDU queue into a MAC PDU, and transmits the MAC PDU through the mobile communication module, that is, through a physical layer (PHY) of the mobile communication module.

The offloading scheduling controller may be built in the MAC layer of the mobile communication module (not shown in FIG. 2). The implementation and functions of the offloading scheduling controller will be described later with reference to specific embodiments.

As shown in FIG. 2, the base station or mobile station may receive data in a WLAN coordination mode (that is, the base station or mobile station serves as a receiver). In this case, the WLAN module sends a received MAC PDU, which is input from the outside, through the LLC function entity to the coordination mode management module; the coordination mode management module receives the MAC PDU sent by the LLC function entity, and sends the MAC PDU through the interface of the mobile communication module to a MAC PDU queue in the MAC layer of the mobile communication module, so that the MAC PDU sent by the coordination mode management module is aggregated with a MAC PDU received by the mobile communication module in the MAC PDU queue of the mobile communication module, and is then transferred to an upper radio link control (Radio Link Control, RLC) layer.

As shown in FIG. 2, the base station or mobile station may also transmit or receive data independently through the mobile communication module or the WLAN module (that is, the base station or mobile station needs no WLAN coordination). That is to say, the mobile communication module may transmit upper-layer data independently, and transfer received data to an upper layer independently regardless of the WLAN module. That is to say, the WLAN module is transparent to the mobile communication module. Also, the WLAN module may transmit the upper-layer data independently and transfer received data to the upper layer independently regardless of the mobile communication module. That is to say, the mobile communication module is also transparent to the WLAN module.

The detailed implementation process of transmitting or receiving data through the mobile communication module independently by the base station or mobile station is the same as that in the prior art, and the detailed implementation process of transmitting or receiving data through the WLAN module independently by the base station or mobile station to is the same as that in the prior art, which will not be detailed in the embodiment of the present invention.

Further, when each mobile station in a cell transmits or receives data through the WLAN module independently, the LLC function entity of the base station and the mobile station may be unnecessary.

In the embodiment of the present invention, the LLC function entity may also be replaced by another protocol layer that has a function similar to the aggregation function, which will not be repeated in subsequent embodiments of the present invention.

Embodiment 2

Figure 3:
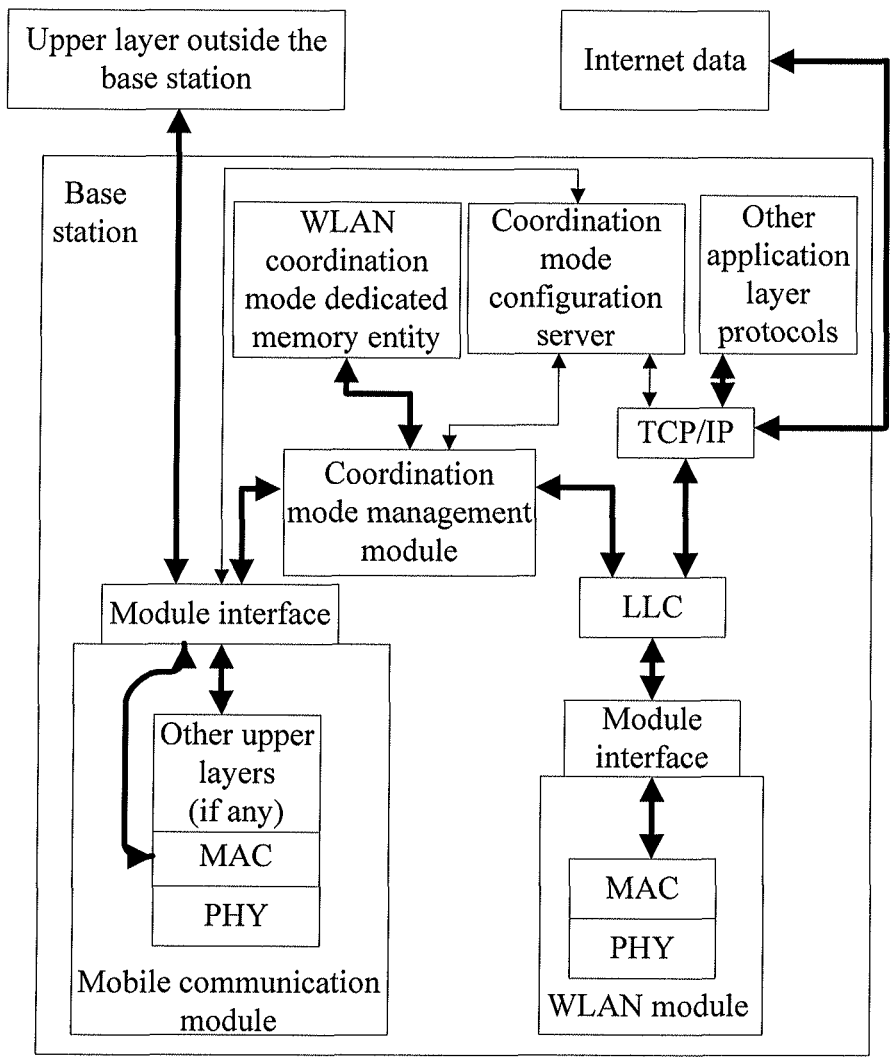
FIG. 3 is a module diagram of a base station in a WLAN coordination mode according to an embodiment of the present invention.

Reference is made to FIG. 3, which is a module diagram of a base station in a WLAN coordination mode according to an embodiment of the present invention, and serves as an implementation manner of Embodiment 1. As shown in FIG. 3, the base station includes a mobile communication module and a WLAN module. The mobile communication module may provide a mobile communication service for an upper layer independently, and the WLAN module may also provide a communication service for a Transmission Control Protocol (Transmission Control Protocol, TCP)/Internet Protocol (Internet Protocol, IP) protocol layer independently. To support the WLAN coordination mode, a coordination mode management module is further added to the base station provided in the embodiment of the present invention, and is adapted to manage WLAN coordinated transmission.

For example, the coordination mode management module on the base station may receive a MAC PDU sent from an interface of the mobile communication module, where a part of MAC SDUs buffered in a MAC SDU queue in a MAC layer of the mobile communication module are packed into the MAC PDU; and the coordination mode management module on the base station may send the MAC PDU, which is sent from the interface of the mobile communication module, through an LLC function entity to the WLAN module for transmission.

In an embodiment, a WLAN coordination mode dedicated memory entity may be further added to the base station provided in the embodiment of the present invention. Correspondingly, before sending the MAC PDU, which is sent from the interface of the mobile communication module, through the LLC function entity to the WLAN module for transmission, the coordination mode management module on the base station may store the MAC PDU, which is sent from the interface of the mobile communication module, into the WLAN coordination mode dedicated memory entity on the base station, and ensure that the data can be sent by the WLAN module successfully.

In an embodiment, the coordination mode management module on the base station may further receive a MAC layer command from the mobile communication module, and cancel WLAN coordinated transmission of a part of data stored in the WLAN coordination mode dedicated memory entity, thereby improving controllability of WLAN coordinated transmission.

For example, the coordination mode management module on the base station may receive data sent by the WLAN module through the LLC function entity, store the data into the WLAN coordination mode dedicated memory entity on the base station, and send the data, which is sent by the WLAN module through the LLC function entity, to a MAC PDU queue in the MAC layer of the mobile communication module through the interface of the mobile communication module, so that the MAC PDU sent by the coordination mode management module on the base station is aggregated with a MAC PDU received by the mobile communication module in the MAC PDU queue of the mobile communication module, and is then transferred to an upper layer.

In the embodiment of the present invention, the WLAN coordination mode dedicated memory entity on the base station is primarily adapted to buffer data of communication between the mobile communication module and the WLAN module in the WLAN coordination mode.

In an embodiment, a coordination mode configuration server may be further added to the base station provided in the embodiment of the present invention, and is adapted to configure and start WLAN coordinated transmission through a TCP/IP protocol. The coordination mode configuration server may perform steps A1 and B1 in Embodiment 1 to configure and start WLAN coordinated transmission. The coordination mode configuration server will be further described later with reference to specific embodiments.

In the embodiment of the present invention, in order for the base station to implement the WLAN coordination mode, a MAC layer function entity of the mobile communication module needs to be modified, and a data transmission channel from the MAC layer to the interface of the mobile communication module needs to be provided, which will be further described later with reference to specific embodiments.

Figure 4:
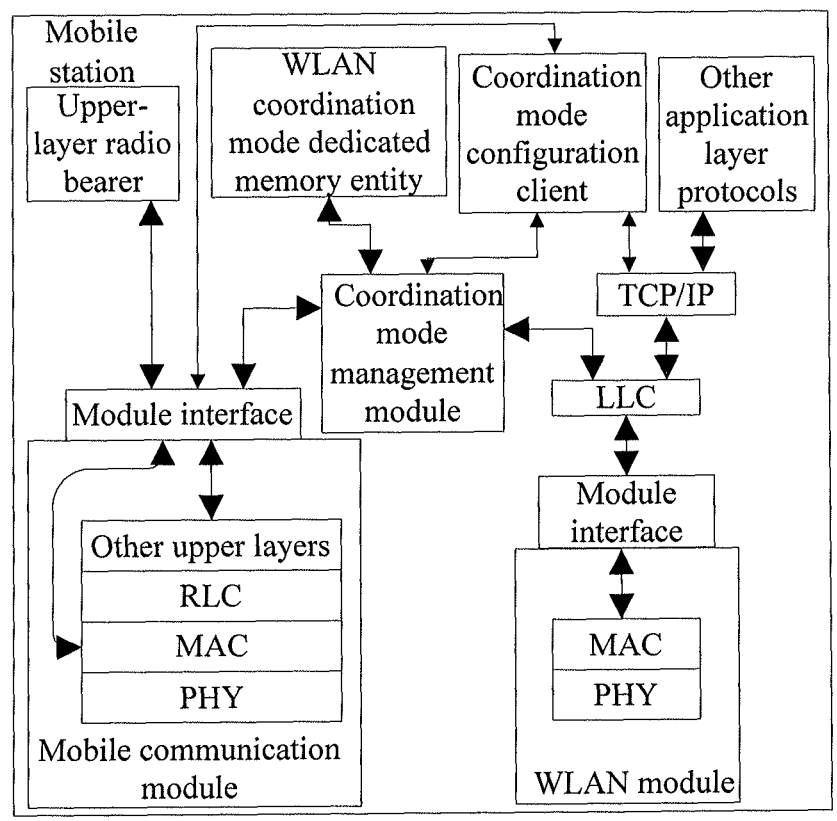
FIG. 4 is a module diagram of a mobile station in a WLAN coordination mode according to an embodiment of the present invention.

Reference is made to FIG. 4, which is a module diagram of a mobile station in a WLAN coordination mode according to an embodiment of the present invention, and serves as a possible implementation manner of Embodiment 1. As shown in FIG. 4, the mobile station includes a mobile communication module and a WLAN module. The mobile communication module may provide a mobile communication service for an upper layer independently, and the WLAN module may also provide a communication service for a TCP/IP protocol layer independently. To support the WLAN coordination mode, a coordination mode management module is further added to the mobile station provided in the embodiment of the present invention, and is adapted to manage WLAN coordinated transmission.

For example, the coordination mode management module on the mobile station may receive a MAC PDU sent from an interface of the mobile communication module, where a part of MAC SDUs buffered in a MAC SDU queue in a MAC layer of the mobile communication module are packed into the MAC PDU; and the coordination mode management module on the mobile station may send the MAC PDU, which is sent from the interface of the mobile communication module, through an LLC function entity to the WLAN module for transmission.

In an embodiment, a WLAN coordination mode dedicated memory entity may be further added to the mobile station provided in the embodiment of the present invention. Correspondingly, before sending the MAC PDU, which is sent from the interface of the mobile communication module, through the LLC function entity to the WLAN module for transmission, the coordination mode management module on the mobile station may store the MAC PDU, which is sent from the interface of the mobile communication module, into the WLAN coordination mode dedicated memory entity on the mobile station, and ensure that the data can be sent by the WLAN module successfully.

In an embodiment, the coordination mode management module on the mobile station may further receive a MAC layer command from the mobile communication module, and cancel WLAN coordinated transmission of a part of data stored in the WLAN coordination mode dedicated memory entity, thereby improving controllability of WLAN coordinated transmission.

For example, the coordination mode management module on the mobile station may receive data sent by the WLAN module through the LLC function entity, store the data into the WLAN coordination mode dedicated memory entity on the mobile station, and send the data, which is sent by the WLAN module through the LLC function entity, to a MAC PDU queue in the MAC layer of the mobile communication module through the interface of the mobile communication module, so that the MAC PDU sent by the coordination mode management module on the mobile station is aggregated with a MAC PDU received by the mobile communication module in the MAC PDU queue of the mobile communication module.

In the embodiment of the present invention, the WLAN coordination mode dedicated memory entity on the mobile station is primarily adapted to buffer data of communication between the mobile communication module and the WLAN module in the WLAN coordination mode.

In an embodiment, a coordination mode configuration client may be further added to the mobile station provided in the embodiment of the present invention, and is adapted to configure and start WLAN coordinated transmission through a TCP/IP protocol. The coordination mode configuration client may perform steps A1 and B1 in Embodiment 1 to configure and start WLAN coordinated transmission. The coordination mode configuration client will be further described later in the embodiments of the present invention, and will not be detailed herein.

In the embodiment of the present invention, in order for the mobile station to implement the WLAN coordination mode, a MAC layer function entity of the mobile communication module needs to be modified, and a data transmission channel from the MAC layer to the interface of the mobile communication module needs to be provided, which will be further described later with reference to specific embodiments.

In the embodiment of the present invention, the following descriptions are applicable to both the base station and the mobile station in the WLAN coordination mode:

When data (MAC PDU) is sent in the WLAN coordination mode, the data is offloaded in the MAC layer of the mobile communication module: One part of the data is still sent through the mobile communication module; and the other part of the data is transmitted to the coordination mode management module through the interface of the mobile communication module, and may be temporarily buffered in the WLAN coordination mode dedicated memory entity, and the coordination mode management module is responsible for transmitting this part of data through the LLC function entity to the WLAN module for transmission.

When external data (MAC PDU) is received in the WLAN coordination mode, the WLAN module may transmit the received data to the coordination mode management module through the LLC function entity, where the received data may be temporarily buffered in the WLAN coordination mode dedicated memory entity, and the coordination mode management module is responsible for transmitting this part of data through the interface of the mobile communication module to the MAC PDU queue in the MAC layer of the mobile communication module for aggregation. In the embodiment of the present invention, the LLC function entity may further identify the type of the data received by the WLAN module, transmit communication data of a conventional WLAN module to the TCP/IP protocol layer, and transmit WLAN coordinated communication data to the coordination mode management module. In an embodiment, the WLAN coordinated communication data may carry an identifier, so that the LLC function entity can identify the type of the data received by the WLAN module as the LAN coordinated communication data according to the identifier.

Embodiment 3

Figure 5:
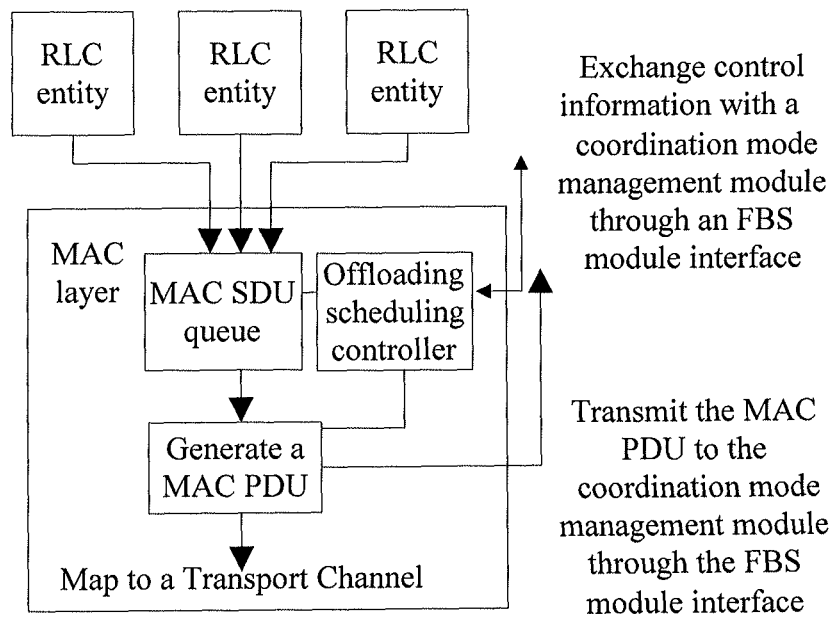
FIG. 5 is a module diagram of a MAC layer of a mobile communication module in a WLAN coordination mode according to an embodiment of the present invention.

Reference is made to FIG. 5, which is a module diagram of a MAC layer of a mobile communication module (a mobile communication module of a base station or a mobile station) in a WLAN coordination mode according to an embodiment of the present invention, and serves as an implementation manner of the MAC layer of the mobile communication module in Embodiment 2. In this embodiment, the mobile communication module includes, but is not limited to, a mobile communication module that supports LTE, HSPA, and HSPA+ mobile communication protocols.

Compared with an existing MAC layer, the MAC layer shown in FIG. 5 is modified as follows:

1. A data channel from a MAC PDU generating module to an interface of the mobile communication module is added, and the data channel is adapted to transfer data (MAC PDU) that needs to be transmitted in the WLAN coordination mode.

2. An offloading scheduling controller is added to perform offloading scheduling on MAC SDUs buffered in a MAC SDU queue. One part of the data is still sent through the mobile communication module, that is, through a transport channel (Transport channel); and the other part of the data is transmitted to a coordination mode management module through an interface of the mobile communication module, and may be temporarily buffered in a WLAN coordination mode dedicated memory entity, and the coordination mode management module is responsible for transmitting this part of data through an LLC function entity to a WLAN module for transmission. The offloading scheduling controller may be an element of an original controller at the MAC layer. The offloading scheduling controller may further exchange offloading control information with the coordination mode management module through the interface of the mobile communication module to enhance performance of a scheduling algorithm.

Figure 6:
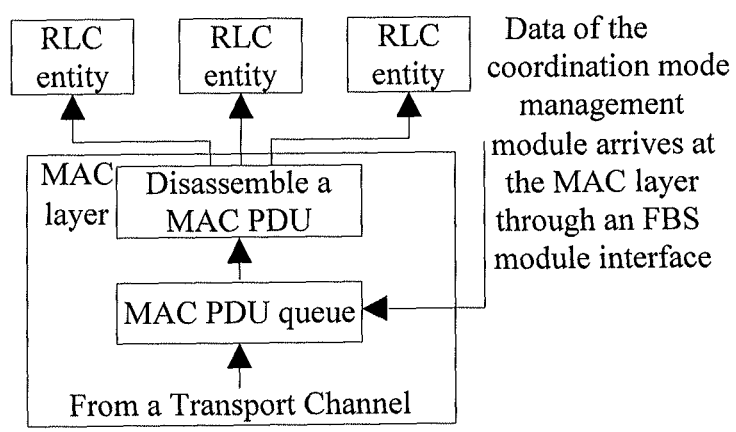
FIG. 6 is a module diagram of a MAC layer of another mobile communication module in a WLAN coordination mode according to an embodiment of the present invention.

Reference is made to FIG. 6, which is a module diagram of a MAC layer of another mobile communication module (a mobile communication module of a base station or a mobile station) in a WLAN coordination mode according to an embodiment of the present invention, and serves as another implementation manner of the MAC layer of the mobile communication module in Embodiment 2.

Compared with an existing MAC layer, the MAC layer shown in FIG. 6 is modified as follows:

1. A data channel from a MAC PDU queue to an interface of the mobile communication module is added, and the data channel is adapted to transfer data (MAC PDU) that is received in the WLAN coordination mode.

The MAC PDU queue may receive a MAC PDU uploaded from a lower layer through a transport channel (Transport channel), and may further receive a MAC PDU that is sent by the WLAN module and received from an interface of the mobile communication module, aggregate and disassemble the MAC PDU, and then transfer the MAC PDU to an upper-layer RLC entity.

In this embodiment, when no WLAN coordinated transmission mode is started, the working process of the MAC layer in this embodiment is the same as that in the prior art; when a WLAN coordinated transmission mode is started, the working process of the MAC layer in this embodiment may be as follows:

1. Transmit data in the WLAN coordination mode:

An offloading scheduling controller may pack a part of MAC SDUs buffered in a MAC SDU queue into a MAC PDU according to mobile communication channel information, the length of the MAC SDU queue (that is, the number of MAC SDUs), control information transferred by a coordination mode management module, and so on; and then sends the data to the coordination mode management module through the interface of the mobile communication module, where the data may be temporarily buffered in a WLAN coordination mode dedicated memory entity, and the coordination mode management module is responsible for transmitting this part of data through an LLC function entity to a WLAN module for transmission. The offloading scheduling controller packs a remaining part of the MAC SDUs buffered in the MAC SDU queue into a MAC PDU, and transmits the MAC PDU by using an existing transmission mechanism of the mobile communication module. Further, the offloading scheduling controller may command the coordination mode management module to cancel transmission of a part of data as required.

2. Receive data in the WLAN coordination mode:

The MAC PDUs received by the mobile communication module and the WLAN module are aggregated in the MAC PDU queue of the mobile communication module, disassembled, and then transmitted to an upper layer.

Embodiment 4

Figure 7:
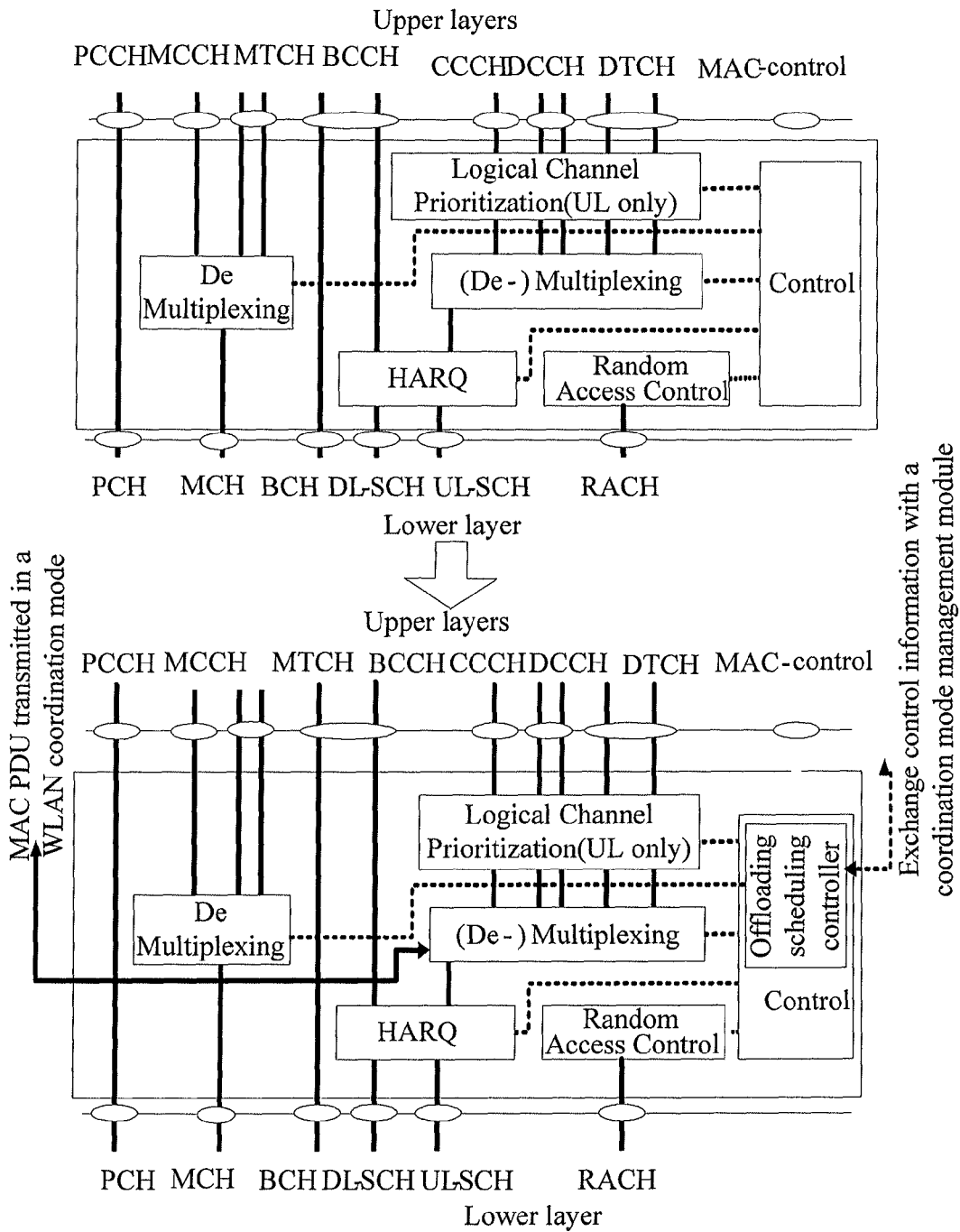
FIG. 7 is a logic diagram of a MAC layer of a mobile communication module in an LTE Femtocell according to an embodiment of the present invention.

Reference is made to FIG. 7, which is a logic diagram of a MAC layer of a mobile communication module in an LTE Femtocell according to this embodiment, shows how to modify a MAC layer function entity of a mobile communication module in an existing LTE Femtocell to support a WLAN coordinated transmission mode, and serves as a specific implementation manner of the MAC layer of the mobile communication module in Embodiment 2. The MAC layer provided in this embodiment is applicable to both a base station and a mobile station that support the WLAN coordinated transmission mode. By using this embodiment, the uplink and downlink can both support the WLAN coordinated transmission mode.

In the MAC layer shown in FIG. 7, a de-multiplexing/multiplexing ((De-)Multiplexing) module is a function entity that packs MAC SDUs received by an upper-layer common control channel (CCCH), a dedicated control channel (DCCH), and a dedicated transport channel (DTCH) into a MAC PDU in specific order. To implement WLAN coordinated transmission, the MAC layer of the mobile communication module in the existing LTE Femtocell needs to be modified in the following two aspects:

1. A data channel from a (De-)Multiplexing module to an interface of the mobile communication module is added, where the data channel is adapted to transfer a MAC PDU generated by the (De-)Multiplexing module to the interface of the mobile communication module.

The data channel may also send a MAC PDU, which is sent from the interface of the mobile communication module, to the (De-)Multiplexing module.

2. An offloading scheduling controller adapted to offload the MAC PDU generated by the (De-)Multiplexing module is added. The offloading scheduling controller may pack a part of MAC SDUs from the CCCH, DCCH, and DTCH into a MAC PDU, and transmit the MAC PDU to a coordination mode management module through the data channel and the interface of the mobile communication module, where this part of data may be temporarily buffered in a WLAN coordination mode dedicated memory entity, and the coordination mode management module is responsible for transmitting this part of data through an LLC function entity to a WLAN module for transmission. The offloading scheduling controller may pack a remaining part of MAC SDUs from the CCCH, DCCH, and DTCH into a MAC PDU, and transmit the MAC PDU through the mobile communication module.

The offloading scheduling controller may exchange control information with the coordination mode management module through the interface of the mobile communication module, where the control information may include the number of MAC PDUs to be sent in the WLAN coordinated transmission dedicated memory entity, an average waiting time of the MAC PDUs, a waiting time of a MAC PDU currently to be sent, an available spectrum bandwidth of a MAC module, a peak transmission rate of the MAC module, and so on, and may also include a control instruction for commanding the coordination mode management module to start/cancel WLAN coordinated communication.

Embodiment 5

Figure 8:
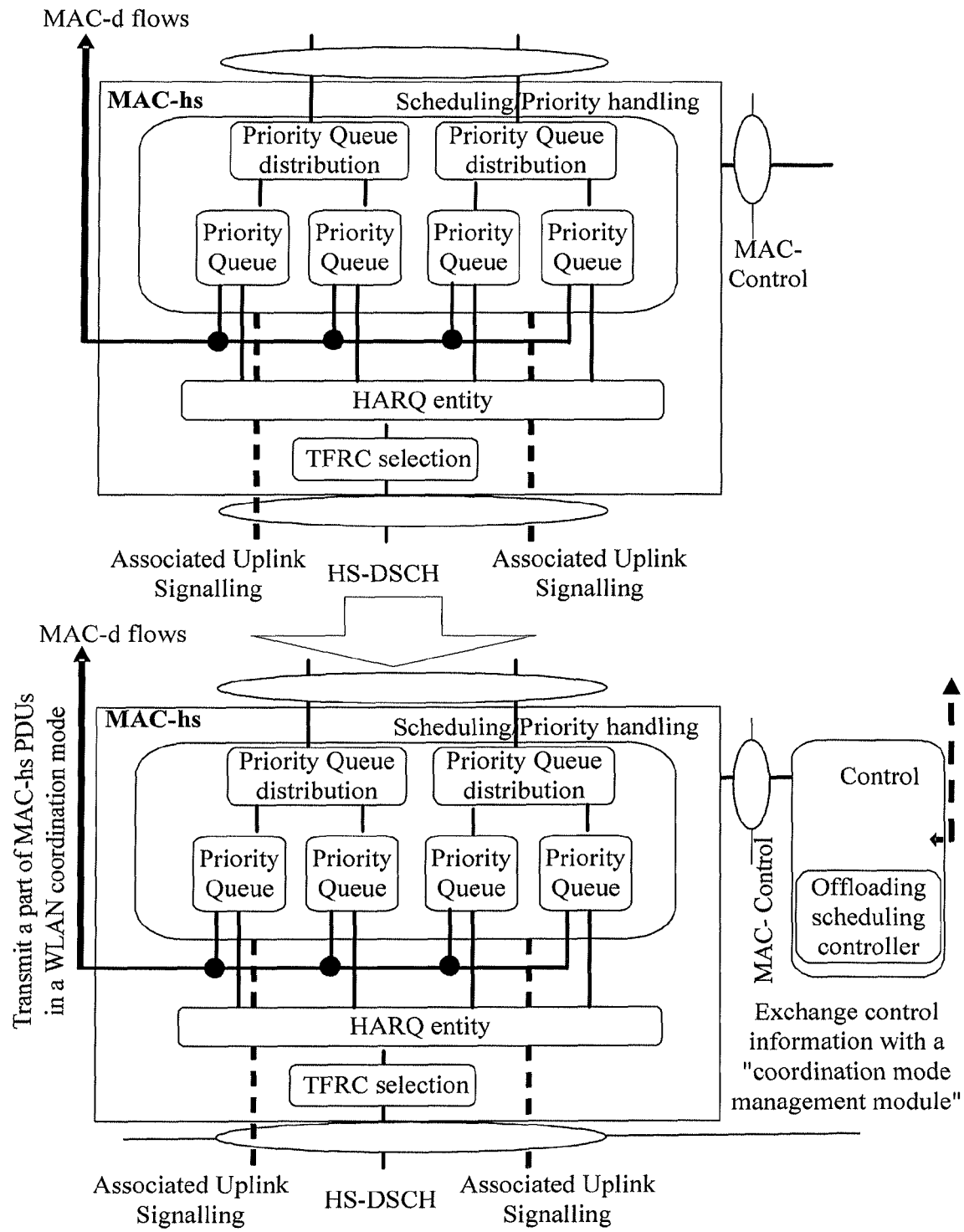
FIG. 8 is a logic diagram of a MAC layer of a mobile communication module in an HSPA Femtocell according to an embodiment of the present invention.

Reference is made to FIG. 8, which is a logic diagram of a MAC layer of a mobile communication module in an HSPA Femtocell according to this embodiment, shows how to modify a MAC-hs function entity of a mobile communication module in an existing HSPA Femtocell, so that a WLAN coordinated transmission mode can be used in downlink data transmission, and serves as a specific implementation manner of the MAC layer of the mobile communication module in Embodiment 2.

To implement WLAN coordinated transmission, the MAC layer of the mobile communication module in the existing HSPA Femtocell needs to be modified in the following two aspects:

1. A data channel from each priority queue (Priority Queue) to an interface of the mobile communication module is added, where the channel transmits MAC PDUs of the MAC-hs function entity in a WLAN coordination mode.

2. An offloading scheduling controller is added, and adapted to: offload sent MAC PDUs, pack a part of the MAC SDUs into a MAC PDU, and transmit the MAC PDU to a coordination mode management module through the data channel and the interface of the mobile communication module, where this part of data may be temporarily buffered in a WLAN coordination mode dedicated memory entity, and the coordination mode management module is responsible for transmitting this part of data through an LLC function entity to a WLAN module for transmission; and pack a remaining part of the MAC SDUs into a MAC PDU, and transmit the MAC PDU through the mobile communication module.

The offloading scheduling controller may exchange control information with the coordination mode management module through the interface of the mobile communication module, where the control information may include the number of MAC PDUs to be sent in the WLAN coordinated transmission dedicated memory entity, an average waiting time of the MAC PDUs, a waiting time of a MAC PDU currently to be sent, an available spectrum bandwidth of a MAC module, a peak transmission rate of the MAC module, and so on, and may also include a control instruction for commanding the coordination mode management module to start/cancel the WLAN coordination mode.

Figure 9:
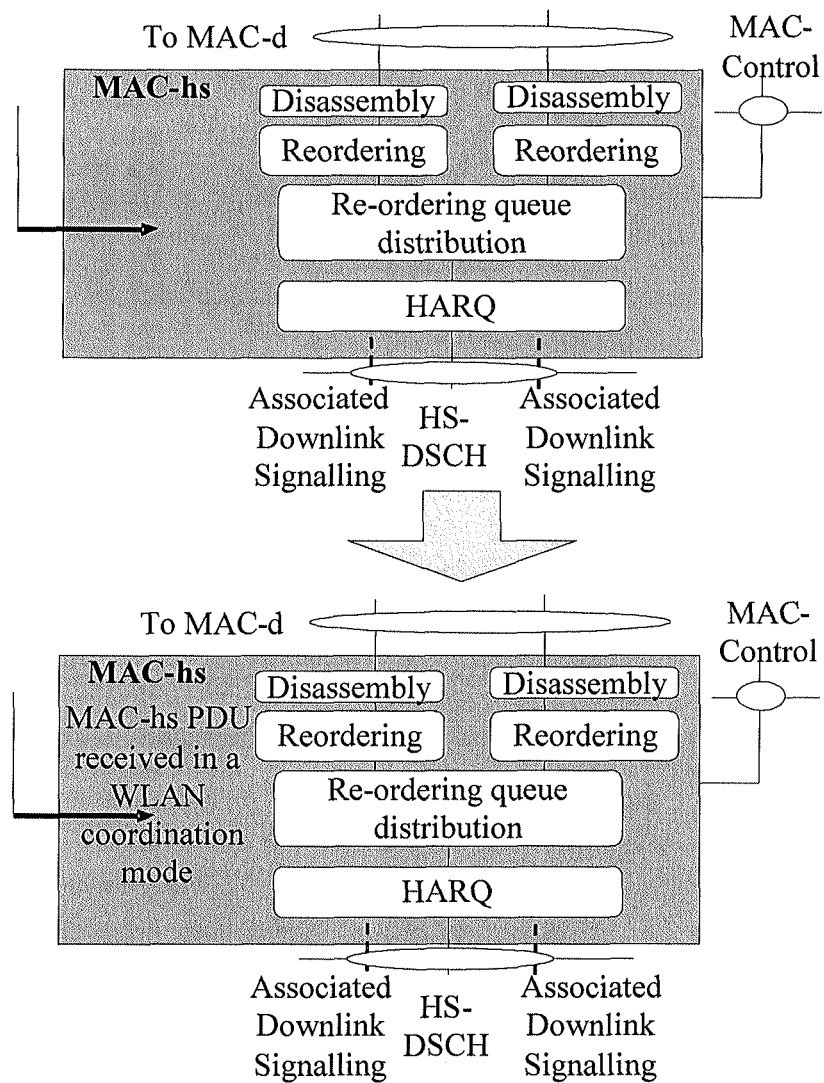
FIG. 9 is a logic diagram of a MAC layer of another mobile communication module in an HSPA Femtocell according to an embodiment of the present invention.

Reference is made to FIG. 9, which is a logic diagram of a MAC layer of another mobile communication module in an HSPA Femtocell according to this embodiment, shows how to modify a MAC-hs function entity of a mobile communication module in an existing HSPA Femtocell, so that a WLAN coordination mode can be used in downlink data reception, and serves as a specific implementation manner of the MAC layer of the mobile communication module in Embodiment 2.

As shown in FIG. 9, the MAC layer of the mobile communication module in the existing HSPA Femtocell needs to be modified as follows:

1. A data channel from an interface of the mobile communication module to a Re-ordering queue distribution module is added, where the data channel is adapted to transmit a MAC PDU received by the interface of the mobile communication module to the MAC-hs function entity. The MAC PDU received by the interface of the mobile communication module is received by a WLAN module and transmitted to the interface of the mobile communication module through an LLC function entity and a coordination mode management module. The MAC PDU transmitted by the coordination mode management module to the interface of the mobile communication module may also be buffered in a WLAN coordination mode dedicated memory entity.

In this embodiment, for an HSPA+ Femtocell, a corresponding data channel and a corresponding offloading scheduling controller may also be added in a MAC-ehs function entity of the mobile communication module, so that the WLAN coordinated transmission mode is supported in downlink data transmission and downlink data reception.

Embodiment 6

This embodiment gives details about processes of starting, maintaining and terminating a WLAN coordination mode in the module diagram shown in Embodiment 2.

I. Start the WLAN coordination mode:

Before starting the WLAN coordination mode, a WLAN coordinated communication mode needs to be preconfigured, which includes the following steps:

1. A coordination mode configuration server in a base station obtains a cell ID of a Femtocell from a mobile communication module, and sets an SSID of a WLAN module of the base station according to a mapping relationship from the cell ID to the SSID.

2. A user inputs access information (such as an access password) of the WLAN module on a mobile station manually, so that a WLAN module on the mobile station can access the WLAN module of the base station.

The following process describes how to start the WLAN coordination mode after the mobile station enters a Femtocell that supports the WLAN coordination mode:

1. A device operating system on the mobile station starts a program in a coordination mode configuration client.

2. The coordination mode configuration client obtains a cell ID of the Femtocell from a mobile communication module of the mobile station, and obtains an SSID of a WLAN AP according to a mapping relationship from the cell ID to the SSID, where the obtained SSID is denoted by SSID1.

3. The coordination mode configuration client searches for WLAN APs through a WLAN module of the mobile station and obtains a list of SSIDs of accessible WLAN APs, and searches the list to check whether the SSID1 is existent; if the SSID1 is found in the list, the coordination mode configuration client lets the WLAN module of the mobile station be connected to a WLAN AP corresponding to the SSID1; otherwise, the coordination mode configuration client waits for a change of the cell ID before performing step 2.

4. The coordination mode configuration client performs mutual authentication with the coordination mode configuration server on the base station through the WLAN module.

5. If the base station has rights of WLAN coordinated transmission, the coordination mode configuration client notifies the coordination mode management module and the mobile communication module of the mobile station of starting the WLAN coordination mode.

The following process describes how a Femtocell base station starts a coordination mode:

A1. A coordination mode configuration server obtains a cell identifier ID of a Femtocell from a mobile communication module of the base station, and sets an SSID of a WLAN AP according to a mapping relationship from the cell identifier ID to the SSID.

B1. The coordination mode configuration server performs WLAN coordinated transmission right authentication with a coordination mode configuration client on a mobile station through a WLAN module; and, if the mobile station has rights of WLAN coordinated transmission, the coordination mode configuration server notifies a coordination mode management module and the mobile communication module of starting WLAN coordinated transmission.

In this embodiment, the coordination mode management module of the base station may maintain a table of mapping from a mobile communication ID of a user to a MAC address. The mobile communication ID of the user refers to a mobile communication system identifier allocated by the FBS after the mobile station enters the Femtocell; and the MAC address refers to a MAC address of the WLAN module of the mobile station. When a new mobile station starts the WLAN coordination mode, the coordination mode management module adds a corresponding mapping relationship to the mapping table. When a mobile station terminates the WLAN coordination mode, the coordination mode management module deletes a corresponding mapping relationship from the mapping table.

To implement the WLAN coordination mode, an LLC address needs to be reserved on both the base station and the mobile station, and all data transmitted in the WLAN coordination mode is sent to an LLC function entity corresponding to the LLC address. The LLC address may be specified beforehand, or decided dynamically through negotiation between the coordination mode client and the coordination mode server.

II. Maintain and terminate the WLAN coordination mode:

In this embodiment, both the base station and the mobile station can initiate a process of terminating the coordinated transmission mode. When finding that one of the following three circumstances occurs, the base station may trigger a process of terminating coordination:

1. The mobile station is handed over to another cell.

2. The WLAN module of the mobile station fails to communicate with the WLAN module of the FBS.

3. A notification of terminating coordinated transmission is received, where the notification is sent by the coordination mode configuration client of the mobile station to the coordination mode configuration server of the base station.

The process of terminating coordination by the base station is as follows:

1. The coordination mode management module of the base station purges the mobile station's MAC PDUs that have not been sent successfully in the WLAN coordination mode dedicated memory entity, and notifies the mobile communication module that the data has not been sent successfully.

2. The coordination mode management module deletes relevant mapping in the table of mapping from the mobile communication ID of the user to the MAC address.

When finding that one of the following three circumstances occurs, the mobile station may trigger a process of terminating coordination:

1. The UE is handed over to another cell.

2. A WLAN signal is weaker than a threshold or fails to be received.

3. The WLAN coordinated transmission function is terminated by the user.

The process of terminating coordination by the mobile station is as follows:

1. The coordination mode configuration client sends a notification of terminating coordinated transmission to the coordination mode configuration server if communicating with the coordination mode configuration server through a WLAN module.

2. The coordination mode management module of the mobile station purges uplink MAC PDUs that have not been sent successfully in the WLAN coordination mode dedicated memory entity of the mobile station, and notifies the mobile communication module that the data has not been sent successfully.

Embodiment 7

Figure 10:
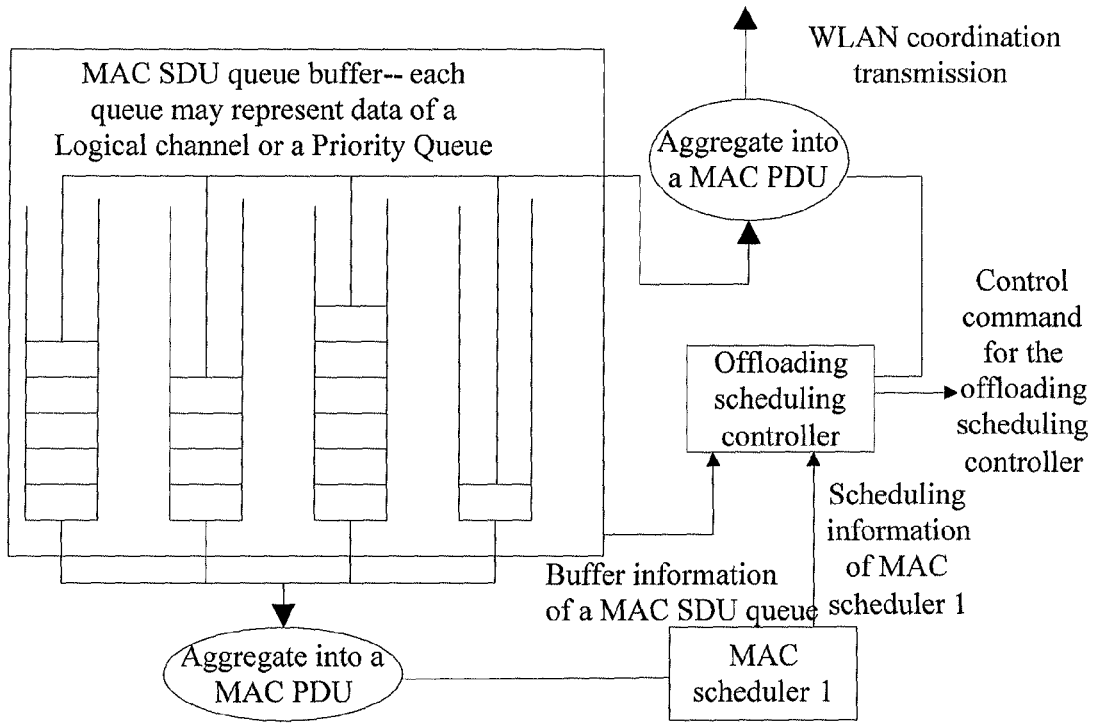
FIG. 10 is a frame diagram of a scheduling algorithm according to an embodiment of the present invention.

This embodiment provides a scheduling algorithm for an offloading scheduling controller. FIG. 10 is a frame diagram of a scheduling algorithm according to this embodiment. The scheduling algorithm is described below:

1. An original scheduler for a physical layer of a mobile communication module at a MAC layer remains unchanged, and this scheduler is denoted by MAC scheduler 1.

2. The offloading scheduling controller detects the number of MAC SDUs buffered in a MAC SDU queue, and triggers offloading scheduling if the number of MAC SDUs exceeds a preset threshold (the preset threshold may be related to a current average transmission rate of the mobile communication module).

The offloading scheduling is described below: The offloading scheduling controller may aggregate several MAC SDUs, which are buffered at the end of the MAC SDU queue, into a MAC PDU according to a specific rule, and, through an interface of the mobile communication module, deliver the MAC PDU to a coordination mode management module for sending. This process is transparent to the original scheduler at the MAC layer.

3. If the MAC SDUs have been sent in a WLAN coordination mode before the MAC scheduler 1 schedules the MAC SDUs, and a feedback indicating correct sending is received through a WLAN module, the MAC SDUs buffered in the MAC SDU queue are deleted; on the contrary, if no correct feedback sent by the MAC PDUs corresponding to the MAC SDUs is received from the MAC module when the MAC scheduler 1 schedules the MAC SDUs, the offloading scheduling controller may command the coordination mode management module to cancel WLAN coordinated transmission of the MAC PDUs, and the MAC PDUs are sent by the mobile communication module instead.

Described above is a WLAN coordinated data transmission method according to the embodiment of the present invention. The embodiment of the present invention can implement data offloading scheduling at a MAC layer of a mobile communication module, and therefore, when a base station and a mobile station need to send data, the data may be sent through a WLAN module and the mobile communication module. That is to say, the data that needs to be sent by the base station and the mobile station may be sent through WLAN resources and Femtocell resources. Compared with the prior art which sends data through Femtocell resources only, the embodiment of the present invention can shorten the air interface transmission delay of a system and improve communication experience of mobile communication users.

Figure 11:
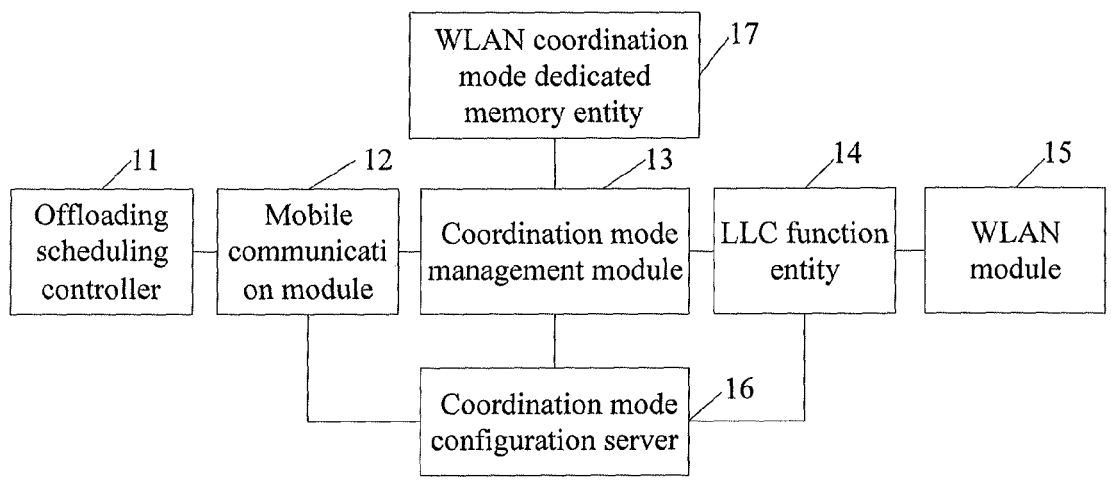
FIG. 11 is a schematic structural diagram of a WLAN coordinated data transmission device according to an embodiment of the present invention.

Reference is made to FIG. 11, which is a schematic structural diagram of a WLAN coordinated data transmission device according to an embodiment of the present invention. The data transmission device shown in FIG. 11 may be a base station. As shown in FIG. 11, the data transmission device may include:

an offloading scheduling controller 11, a mobile communication module 12, a coordination mode management module 13, an LLC function entity 14, and a WLAN module 15.

The offloading scheduling controller 11 is adapted to detect whether the number of MAC SDUs buffered in a MAC SDU queue of the mobile communication module 12 exceeds a preset threshold, and, if so, pack a part of the MAC SDUs into a MAC PDU, and send the MAC PDU to the coordination mode management module 13 through an interface of the mobile communication module; the coordination mode management module 13 is adapted to receive the MAC PDU containing the packed part of the MAC SDUs and send the MAC PDU to the LLC function entity 14; the LLC function entity 14 is adapted to receive the MAC PDU sent by the coordination mode management module 13 and send the MAC PDU to the WLAN module 15 for transmission; and the offloading scheduling controller 11 is further adapted to pack a remaining part of the MAC SDUs buffered in the MAC SDU queue into a MAC PDU, and transmit the MAC PDU through the mobile communication module 12.

As shown in FIG. 11, in an embodiment, the data transmission device may further include:

a coordination mode configuration server 16, adapted to: obtain a cell identifier ID of a Femtocell from the mobile communication module 12, and set an SSID of a WLAN AP according to a mapping relationship from the cell identifier ID to the SSID; and perform WLAN coordinated transmission right authentication with a coordination mode configuration client on a mobile station through the WLAN module 15, and, if the mobile station has rights of WLAN coordinated transmission, notify the coordination mode management module 13 and the mobile communication module 12 of starting WLAN coordinated transmission.

In an embodiment, the WLAN module 15 is further adapted to receive a MAC PDU input from the outside, and send the MAC PDU to the LLC function entity 14; the LLC function entity 14 is adapted to send the MAC PDU, which is sent by the WLAN module 15, to the coordination mode management module 13; and the coordination mode management module 13 is adapted to receive the MAC PDU sent by the LLC function entity 14, and send the MAC PDU to a MAC PDU queue of the mobile communication module 12 through the interface of the mobile communication module, where the MAC PDU sent by the coordination mode management module 13 is aggregated with a MAC PDU received by the mobile communication module 12 in the MAC PDU queue of the mobile communication module 12.

In an embodiment, the offloading scheduling controller 13 is specifically adapted to detect whether the number of MAC SDUs buffered in the MAC SDU queue of the mobile communication module 12 exceeds the preset threshold, and, if so, aggregate several MAC SDUs buffered at the end of the MAC SDU queue into a MAC PDU, and send the MAC PDU to the coordination mode management module 13 through the interface of the mobile communication module 12.

As shown in FIG. 11, in an embodiment, the data transmission device may further include:

a WLAN coordination mode dedicated memory entity 17, adapted to store the MAC PDU containing the packed part of the MAC SDUs that is received by the coordination mode management module 13.

Correspondingly, the coordination mode management module 13 is further adapted to store the MAC PDU containing the packed part of the MAC SDUs into the WLAN coordination mode dedicated memory entity 17 before sending the MAC PDU containing the packed part of the MAC SDUs through the LLC function entity 14 to the WLAN module 15.

In an embodiment, the coordination mode management module 13 is further adapted to receive a MAC layer command sent by the mobile communication module 12 as an instruction for canceling coordinated transmission of the part of MAC PDUs stored in the WLAN coordination mode dedicated memory entity 17; and, according to the MAC layer command, cancel sending of the part of MAC PDUs stored in the WLAN coordination mode dedicated memory entity 17 through the LLC function entity 14 to the WLAN module 15 for transmission.

Figure 12:
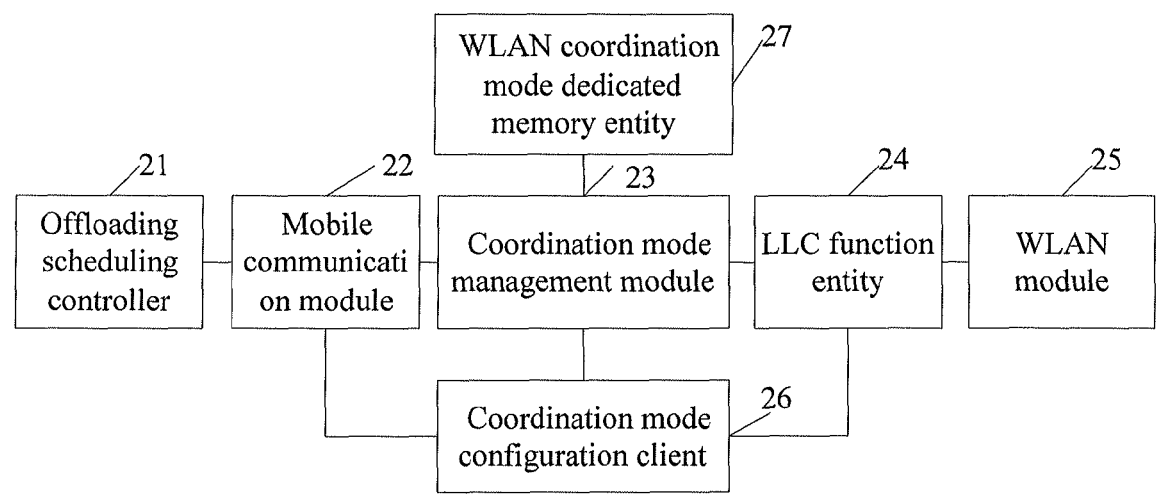
FIG. 12 is a schematic structural diagram of another WLAN coordinated data transmission device according to an embodiment of the present invention.

Reference is made to FIG. 12, which is a schematic structural diagram of a WLAN coordinated data transmission device according to an embodiment of the present invention. The data transmission device shown in FIG. 12 may be a mobile station. As shown in FIG. 12, the data transmission device may include:

an offloading scheduling controller 21, a mobile communication module 22, a coordination mode management module 23, an LLC function entity 24, and a WLAN module 25.

The offloading scheduling controller 21 is adapted to detect whether the number of MAC SDUs buffered in a MAC SDU queue of the mobile communication module 22 exceeds a preset threshold, and, if so, pack a part of the MAC SDUs into a MAC PDU, and send the MAC PDU to the coordination mode management module 23 through an interface of the mobile communication module; the coordination mode management module 23 is adapted to receive the MAC PDU containing the packed part of the MAC SDUs and send the MAC PDU to the LLC function entity 24; the LLC function entity 24 is adapted to receive the MAC PDU sent by the coordination mode management module 23 and send the MAC PDU to the WLAN module 25 for transmission; and the offloading scheduling controller 21 is further adapted to pack a remaining part of the MAC SDUs buffered in the MAC SDU queue into a MAC PDU, and transmit the MAC PDU through the mobile communication module 22.

As shown in FIG. 12, in an embodiment, the data transmission device may further include:

a coordination mode configuration client 26, adapted to: obtain a cell identifier ID of a Femtocell from the mobile communication module, and obtain an SSID of a WLAN AP according to a mapping relationship from the cell identifier ID to the SSID, where the obtained SSID is denoted by SSID1; search for WLAN APs through the WLAN module 25 and obtain a list of SSIDs of accessible WLAN APs, and search the list of SSIDs to check whether the SSID1 is existent, and if existent, trigger the WLAN module 25 to connect to a WLAN AP corresponding to the SSID1; and perform WLAN coordinated transmission right authentication with a coordination mode configuration server on a base station through the WLAN module 25, and, if the base station has rights of WLAN coordinated transmission, notify the coordination mode management module 23 and the mobile communication module 22 of starting WLAN coordinated transmission.

In an embodiment, the WLAN module 25 is further adapted to receive a MAC PDU input from the outside, and send the MAC PDU to the LLC function entity 24; the LLC function entity 24 is adapted to send the MAC PDU, which is sent by the WLAN module 25, to the coordination mode management module 23; and the coordination mode management module 23 is adapted to receive the MAC PDU sent by the LLC function entity 24, and send the MAC PDU to a MAC PDU queue of the mobile communication module 22 through the interface of the mobile communication module, where the MAC PDU sent by the coordination mode management module 23 is aggregated with a MAC PDU received by the mobile communication module 22 in the MAC PDU queue of the mobile communication module 22.

In an embodiment, the offloading scheduling controller 23 is specifically adapted to detect whether the number of MAC SDUs buffered in the MAC SDU queue of the mobile communication module 22 exceeds the preset threshold, and, if so, aggregate several MAC SDUs buffered at the end of the MAC SDU queue into a MAC PDU, and send the MAC PDU to the coordination mode management module 23 through the interface of the mobile communication module 22.

As shown in FIG. 12, in an embodiment, the data transmission device may further include:

a WLAN coordination mode dedicated memory entity 27, adapted to store the MAC PDU containing the packed part of the MAC SDUs that is received by the coordination mode management module 23.

Correspondingly, the coordination mode management module 23 is further adapted to store the MAC PDU containing the packed part of the MAC SDUs into the WLAN coordination mode dedicated memory entity 27 before sending the MAC PDU containing the packed part of the MAC SDUs through the LLC function entity 24 to the WLAN module 25.

In an embodiment, the coordination mode management module 23 is further adapted to receive a MAC layer command sent by the mobile communication module 22 as an instruction for canceling coordinated transmission of the part of MAC PDUs stored in the WLAN coordination mode dedicated memory entity 27; and, according to the MAC layer command, cancel sending of the part of MAC PDUs stored in the WLAN coordination mode dedicated memory entity 27 through the LLC function entity 24 to the WLAN module 25 for transmission.

In the embodiment of the present invention, the MAC SDUs buffered in the MAC SDU queue may be generated by an LTE MAC layer function entity, or generated by a MAC-hs function entity of HSPA, or generated by a MAC-ehs function entity of HSPA+, which is not limited in the embodiment of the present invention.

The embodiment of the present invention can implement data offloading scheduling at a MAC layer of a mobile communication module, and therefore, when a base station and a mobile station need to send data, the data may be sent through a WLAN module and the mobile communication module. That is to say, the data that needs to be sent by the base station and the mobile station may be sent through WLAN resources and Femtocell resources. Compared with the prior art which sends data through Femtocell resources only, the embodiment of the present invention can shorten the air interface transmission delay of a system and improve communication experience of mobile communication users.

Figure 13:
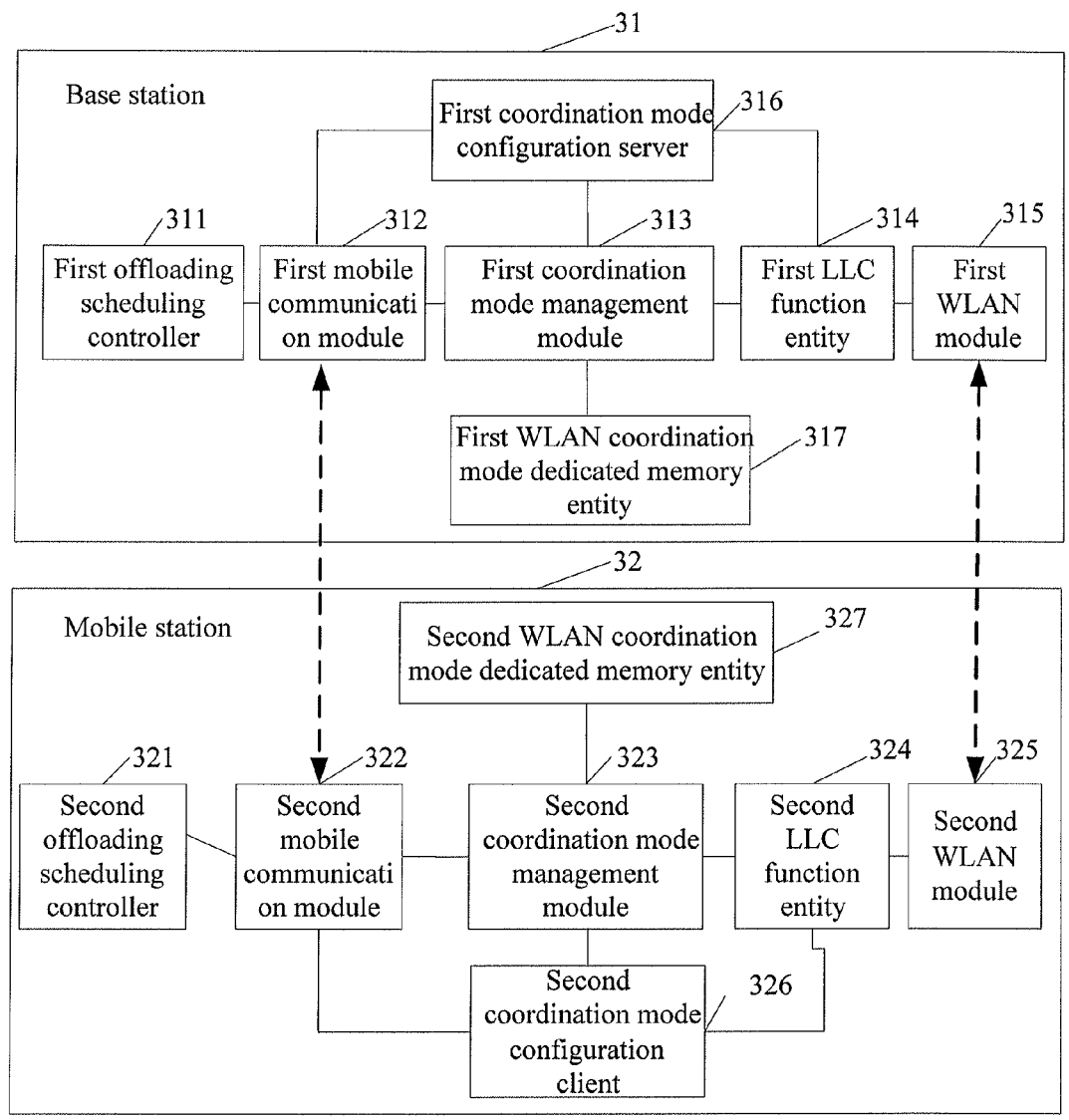
FIG. 13 is a schematic structural diagram of a WLAN coordinated data transmission system according to an embodiment of the present invention.

Reference is made to FIG. 13, which is a schematic structural diagram of a WLAN coordinated data transmission system according to an embodiment of the present invention. The data transmission system may include:

a base station 31 and a mobile station 32.

The base station 31 includes a first offloading scheduling controller 311, a first mobile communication module 312, a first coordination mode management module 313, a first logical link control LLC function entity 314, and a first WLAN module 315.

The first offloading scheduling controller 311 is adapted to detect whether the number of MAC SDUs buffered in a MAC SDU queue of the first mobile communication module 312 exceeds a preset threshold, and, if so, pack a part of the MAC SDUs into a MAC PDU, and send the MAC PDU to the first coordination mode management module 313 through an interface of the first mobile communication module; the first coordination mode management module 313 is adapted to receive the MAC PDU containing the packed part of the MAC SDUs, and send the MAC PDU to the first LLC function entity 314; the first LLC function entity 314 is adapted to receive the MAC PDU sent by the first coordination mode management module 313, and send the MAC PDU to the first WLAN module 315; the first WLAN module 315 is adapted to transmit the MAC PDU, which is sent by the first LLC function entity 314, to the mobile station 32; and the first offloading scheduling controller 311 is further adapted to pack a remaining part of the MAC SDUs buffered in the MAC SDU queue into a MAC PDU, and transmit the MAC PDU to the mobile station 32 through the first mobile communication module 312.

The mobile station 32 includes a second mobile communication module 322, a second coordination mode management module 323, a second logical link control LLC function entity 324, and a second WLAN module 325.

The second WLAN module 325 is adapted to receive the MAC PDU transmitted by the first WLAN module 315, and send the MAC PDU to the second LLC function entity 324; the second LLC function entity 324 is adapted to receive the MAC PDU sent by the second WLAN module 325, and send the MAC PDU to the second coordination mode management module 323; and the second coordination mode management module 323 is adapted to receive the MAC PDU sent by the second LLC function entity 324, and send the MAC PDU to a MAC PDU queue of the second mobile communication module 322 through an interface of the second mobile communication module, where the MAC PDU sent by the second coordination mode management module 323 is aggregated with a MAC PDU received by the second mobile communication module 322 in the MAC PDU queue of the second mobile communication module 322.

As shown in FIG. 13, in an embodiment, the mobile station 32 may further include:

a second offloading scheduling controller 321, adapted to detect whether the number of MAC SDUs buffered in the MAC SDU queue of the second mobile communication module 322 exceeds a preset threshold, and, if so, pack a part of the MAC SDUs into a MAC PDU and send the MAC PDU to the second coordination mode management module 323 through the interface of the second mobile communication module; the second coordination mode management module 323 is adapted to receive the MAC PDU containing the packed part of the MAC SDUs, and send the MAC PDU to the second LLC function entity 324; the second LLC function entity 324 is adapted to receive the MAC PDU sent by the second coordination mode management module 323, and send the MAC PDU to the second WLAN module 325; the second WLAN module 325 is adapted to transmit the MAC PDU, which is sent by the second LLC function entity 324, to the first WLAN module 315 of the base station 31; and the second offloading scheduling controller 321 is further adapted to pack a remaining part of the MAC SDUs buffered in the MAC SDU queue into a MAC PDU, and transmit the MAC PDU to the first mobile communication module 312 of the base station 31 through the second mobile communication module 322;

Correspondingly, the first WLAN module 315 of the base station 31 is adapted to receive the MAC PDU transmitted by the second WLAN module 325, and send the MAC PDU to the first LLC function entity 314; the first LLC function entity 314 is adapted to receive the MAC PDU sent by the first WLAN module 315, and send the MAC PDU to the first coordination mode management module 313; and the first coordination mode management module 313 is adapted to receive the MAC PDU sent by the first LLC function entity 314, and send the MAC PDU to a MAC PDU queue of the first mobile communication module 312 through the interface of the first mobile communication module, where the MAC PDU sent by the first coordination mode management module 313 is aggregated with the MAC PDU received by the first mobile communication module 312 in the MAC PDU queue of the first mobile communication module 312.

In an embodiment, the base station 31 may further include a first WLAN coordination mode dedicated memory entity 317, adapted to buffer data transmitted in a WLAN coordination mode between the first mobile communication module 312 and the first WLAN module 315. The first coordination mode management module 313 is further adapted to receive a MAC layer command sent by the first mobile communication module 312 as an instruction for canceling coordinated transmission of a part of MAC PDUs stored in the first WLAN coordination mode dedicated memory entity 317; and, according to the MAC layer command, cancel sending of the part of MAC PDUs stored in the first WLAN coordination mode dedicated memory entity 317 through the first LLC function entity 314 to the first WLAN module 315 for transmission.

In an embodiment, the mobile station 32 may further include a second WLAN coordination mode dedicated memory entity 327, adapted to buffer data transmitted in a WLAN coordination mode between the second mobile communication module 322 and the second WLAN module 325. The second coordination mode management module 323 is further adapted to receive a MAC layer command sent by the second mobile communication module 322 as an instruction for canceling coordinated transmission of the part of MAC PDUs stored in the second WLAN coordination mode dedicated memory entity 327; and, according to the MAC layer command, cancel sending of the part of MAC PDUs stored in the second WLAN coordination mode dedicated memory entity 327 through the second LLC function entity 324 to the second WLAN module 325 for transmission.

In the WLAN coordinated data transmission system provided in the embodiment of the present invention, data offloading scheduling can be implemented at a MAC layer of a mobile communication module, and therefore, when the mobile communication module needs to send data, the data may be sent through a WLAN module and the mobile communication module. That is to say, the data that needs to be sent by a base station or a mobile station may be sent through WLAN resources and Femtocell resources. Compared with the prior art which sends data through Femtocell resources only, the embodiment of the present invention can shorten the air interface transmission delay of the system and improve communication experience of mobile communication users.

Persons of ordinary skill in the art may understand that all or a part of the steps of the methods in the embodiments may be implemented by a program instructing relevant hardware. The program may be stored in a computer readable storage medium, and the storage medium may include: a flash drive, a read-only memory (Read-Only Memory, ROM), a random access memory (Random Access Memory, RAM), a magnetic disk, an optical disk, or the like.

Detailed above are a WLAN coordinated data transmission method, device, and system provided in the embodiments of the present invention. Although the principle and implementation manners of the present invention are described with reference to specific embodiments, the embodiments are only used to help understand the method and core idea of the present invention. In addition, with respect to the implementation manners and applicability of the present invention, modifications and variations may be made by persons of ordinary skill in the art according to the idea of the present invention. Therefore, the specification shall not be construed as a limitation to the present invention.

What is claimed is:

1. A wireless local area network coordinated data transmission method, comprising:

detecting, by an offloading scheduling controller, whether the number of MAC SDUs buffered in a medium access control service data unit MAC SDU queue of a mobile communication module of a Femtocell exceeds a preset threshold, and, if so, packing a part of the MAC SDUs into a medium access control protocol data unit MAC PDU, and sending the MAC PDU to a coordination mode management module through an interface of the mobile communication module;

sending, by the coordination mode management module, the MAC PDU containing the packed part of the MAC SDUs through a logical link control LLC function entity to a wireless local area network WLAN module for transmission; and packing, by the offloading scheduling controller, a remaining part of the MAC SDUs buffered in the MAC SDU queue into a MAC PDU, and transmitting the MAC PDU through the mobile communication module.

2. The data transmission method according to claim 1, further comprising:

obtaining, by a coordination mode configuration server, a cell identifier ID of the Femtocell from the mobile communication module of the Femtocell, and setting an SSID of a wireless local area network access point WLAN AP according to a mapping relationship from the cell identifier ID to the service set identifier SSID;

performing, by the coordination mode configuration server, WLAN coordinated transmission right authentication with a coordination mode configuration client on a mobile station through the WLAN module; and if the mobile station has rights of WLAN coordinated transmission, notifying, by the coordination mode configuration server, the coordination mode management module and the mobile communication module of starting WLAN coordinated transmission.

3. The data transmission method according to claim 1, further comprising:

obtaining, by a coordination mode configuration client, a cell identifier ID of the Femtocell from the mobile communication module of the Femtocell, and obtaining an SSID of a wireless local area network access point WLAN AP according to a mapping relationship from the cell identifier ID to the service set identifier SSID, wherein the obtained SSID is denoted by SSID1; and searching, by the coordination mode configuration client, for WLAN APs through the WLAN module and obtaining a list of SSIDs of accessible WLAN APs, and searching the list of SSIDs to check whether the SSID1 is existent, and, if existent, triggering the WLAN module to connect to a WLAN AP corresponding to the SSID1;

performing, by the coordination mode configuration client, WLAN coordinated transmission right authentication with a coordination mode configuration server on a base station through the WLAN module; and if the base station has rights of WLAN coordinated transmission, notifying, by the coordination mode configuration client, the coordination mode management module and the mobile communication module of starting WLAN coordinated transmission.

4. The data transmission method according to claim 1, further comprising:

receiving, by the WLAN module, a MAC PDU input from the outside, and sending the MAC PDU to the coordination mode management module through the LLC function entity; and receiving, by the coordination mode management module, the MAC PDU sent by the LLC function entity, and sending the MAC PDU to a MAC PDU queue of the mobile communication module through the interface of the mobile communication module, so that the MAC PDU sent by the coordination mode management module is aggregated with a MAC PDU received by the mobile communication module in the MAC PDU queue of the mobile communication module.

5. The data transmission method according to claim 4, wherein the packing a part of the MAC SDUs into a medium access control protocol data unit MAC PDU comprises:

aggregating, by the offloading scheduling controller, several MAC SDUs buffered at an end of the MAC SDU queue into the medium access control protocol data unit MAC PDU.

6. The data transmission method according to claim 1, further comprising:

storing, by the coordination mode management module, the MAC PDU containing the packed part of the MAC SDUs into a WLAN coordination mode dedicated memory entity before sending the MAC PDU containing the packed part of the MAC SDUs through the logical link control LLC function entity to the wireless local area network WLAN module.

7. The data transmission method according to claim 6, further comprising:

receiving, by the coordination mode management module, a MAC layer command sent by the mobile communication module as an instruction for canceling coordinated transmission of the part of MAC PDUs stored in the WLAN coordination mode dedicated memory entity; and cancelling, by the coordination mode management module according to the MAC layer command, sending of the part of MAC PDUs stored in the WLAN coordination mode dedicated memory entity through the LLC function entity to the WLAN module for transmission.

8. The data transmission method according to claim 1, wherein the MAC SDUs buffered in the MAC SDU queue are generated by a long term evolution medium access control LTE MAC layer function entity, or generated by a MAC-hs function entity of high-speed packet access HSPA, or generated by a MAC-ehs function entity of high-speed packet access evolution HSPA+.

9. A wireless local area network coordinated data transmission device, comprising:

an offloading scheduling controller, a mobile communication module of a Femtocell, a coordination mode management module, a logical link control LLC function entity, and a WLAN module, wherein:

the offloading scheduling controller is adapted to detect whether the number of MAC SDUs buffered in a medium access control service data unit MAC SDU queue of the mobile communication module exceeds a preset threshold, and, if so, pack a part of the MAC SDUs into a medium access control protocol data unit MAC PDU, and send the MAC PDU to the coordination mode management module through an interface of the mobile communication module;

the coordination mode management module is adapted to receive the MAC PDU containing the packed part of the MAC SDUs, and send the MAC PDU to the LLC function entity;

the LLC function entity is adapted to receive the MAC PDU sent by the coordination mode management module, and send the MAC PDU to the WLAN module for transmission; and the offloading scheduling controller is further adapted to pack a remaining part of the MAC SDUs buffered in the MAC SDU queue into a MAC PDU, and transmit the MAC PDU through the mobile communication module.

10. The data transmission device according to claim 9, further comprising:
a coordination mode configuration server, adapted to: obtain a cell identifier ID of the Femtocell from the mobile communication module of the Femtocell, and set an SSID of a wireless local area network access point WLAN AP according to a mapping relationship from the cell identifier ID to the service set identifier SSID; wherein the coordination mode configuration server performs WLAN coordinated transmission right authentication with a coordination mode configuration client on a mobile station through the WLAN module, and, if the mobile station has rights of WLAN coordinated transmission, notify the coordination mode management module and the mobile communication module of starting WLAN coordinated transmission.

11. The data transmission device according to claim 9, further comprising:
a coordination mode configuration client, adapted to: obtain a cell identifier ID of the Femtocell from the mobile communication module of the Femtocell, and obtain an SSID of a wireless local area network access point WLAN AP according to a mapping relationship from the cell identifier ID to the service set identifier SSID, wherein the obtained SSID is denoted by SSID1; search for WLAN APs through the WLAN module and obtain a list of SSIDs of accessible WLAN APs, and search the list of SSIDs to check whether the SSID1 is existent, and if existent, trigger the WLAN module to connect to a WLAN AP corresponding to the SSID1; and perform WLAN coordinated transmission right authentication with a coordination mode configuration server on a base station through the WLAN module, and, if the base station has rights of WLAN coordinated transmission, notify the coordination mode management module and the mobile communication module of starting WLAN coordinated transmission.

12. The data transmission device according to claim 9, wherein:
the WLAN module is further adapted to receive a MAC PDU input from the outside, and send the MAC PDU to the LLC function entity;
the LLC function entity is adapted to send the MAC PDU, which is sent by the WLAN module, to the coordination mode management module; and
the coordination mode management module is adapted to receive the MAC PDU sent by the LLC function entity, and send the MAC PDU to a MAC PDU queue of the mobile communication module through the interface of the mobile communication module, so that the MAC PDU sent by the coordination mode management module is aggregated with a MAC PDU received by the mobile communication module in the MAC PDU queue of the mobile communication module.

13. The data transmission device according to claim 12, wherein the offloading scheduling controller is specifically adapted to detect whether the number of MAC SDUs buffered in the medium access control service data unit MAC SDU queue of the mobile communication module exceeds the preset threshold, and, if so, aggregate several MAC SDUs buffered at an end of the MAC SDU queue into the medium access control protocol data unit MAC PDU and send the MAC PDU to the coordination mode management module through the interface of the mobile communication module.

14. The data transmission device according to claim 9, further comprising:
a WLAN coordination mode dedicated memory entity, adapted to store the MAC PDU containing the packed part of the MAC SDUs that is received by the coordination mode management module; wherein
the coordination mode management module is further adapted to store the MAC PDU containing the packed part of the MAC SDUs into the WLAN coordination mode dedicated memory entity before sending the MAC PDU containing the packed part of the MAC SDUs through the logical link control LLC function entity to the wireless local area network WLAN module.

15. The data transmission device according to claim 14, wherein:
the coordination mode management module is further adapted to receive a MAC layer command sent by the mobile communication module as an instruction for canceling coordinated transmission of the part of MAC PDUs stored in the WLAN coordination mode dedicated memory entity; and, according to the MAC layer command, cancel sending of the part of MAC PDUs stored in the WLAN coordination mode dedicated memory entity through the LLC function entity to the WLAN module for transmission.

16. The data transmission device according to claim 9, wherein the MAC SDUs buffered in the MAC SDU queue are generated by a long term evolution medium access control LTE MAC layer function entity, or generated by a MAC-hs function entity of high-speed packet access HSPA, or generated by a MAC-ehs function entity of high-speed packet access evolution HSPA+.

17. A wireless local area network coordinated data transmission system, comprising a base station and a mobile station, wherein:
the base station comprises a first offloading scheduling controller, a first mobile communication module, a first coordination mode management module, a first logical link control LLC function entity, and a first WLAN module;
the first offloading scheduling controller is adapted to detect whether the number of MAC SDUs buffered in a medium access control service data unit MAC SDU queue of the first mobile communication module exceeds a preset threshold, and, if so, pack a part of the MAC SDUs into a medium access control protocol data unit MAC PDU, and send the MAC PDU to the first coordination mode management module through an interface of the first mobile communication module; the first coordination mode management module is adapted to receive the MAC PDU containing the packed part of the MAC SDUs, and send the MAC PDU to the first LLC function entity; the first LLC function entity is adapted to receive the MAC PDU sent by the first coordination mode management module, and send the MAC PDU to the first WLAN module; the first WLAN module is adapted to transmit the MAC PDU, which is sent by the first LLC function entity, to the mobile station; and the first offloading scheduling controller is further adapted to pack a remaining part of the MAC SDUs buffered in the MAC SDU queue into a MAC PDU, and transmit the MAC PDU to the mobile station through the first mobile communication module;

the mobile station comprises a second mobile communication module, a second coordination mode management module, a second logical link control LLC function entity, and a second WLAN module;

the second WLAN module is adapted to receive the MAC PDU transmitted by the first WLAN module, and send the MAC PDU to the second LLC function entity; the second LLC function entity is adapted to receive the MAC PDU sent by the second WLAN module, and send the MAC PDU to the second coordination mode management module; and the second coordination mode management module is adapted to receive the MAC PDU sent by the second LLC function entity, and send the MAC PDU to a MAC PDU queue of the second mobile communication module through an interface of the second mobile communication module, wherein the MAC PDU sent by the second coordination mode management module is aggregated with a MAC PDU received by the second mobile communication module in the MAC PDU queue of the second mobile communication module.

18. The data transmission system according to claim 17, wherein the mobile station further comprises:

a second offloading scheduling controller, adapted to detect whether the number of MAC SDUs buffered in the medium access control service data unit MAC SDU queue of the second mobile communication module exceeds a preset threshold, and, if so, pack a part of the MAC SDUs into a medium access control protocol data unit MAC PDU, and send the MAC PDU to the second coordination mode management module through the interface of the second mobile communication module; wherein the second coordination mode management module is adapted to receive the MAC PDU containing the packed part of the MAC SDUs, and send the MAC PDU to the second LLC function entity; the second LLC function entity is adapted to receive the MAC PDU sent by the second coordination mode management module, and send the MAC PDU to the second WLAN module; the second WLAN module is adapted to transmit the MAC PDU, which is sent by the second LLC function entity, to the first WLAN module of the base station; and the second offloading scheduling controller is further adapted to pack a remaining part of the MAC SDUs buffered in the MAC SDU queue into a MAC PDU, and transmit the MAC PDU to the first mobile communication module of the base station through the second mobile communication module; and the first WLAN module is adapted to receive the MAC PDU transmitted by the second WLAN module, and send the MAC PDU to the first LLC function entity; the first LLC function entity is adapted to receive the MAC PDU sent by the first WLAN module, and send the MAC PDU to the first coordination mode management module; and the first coordination mode management module is adapted to receive the MAC PDU sent by the first LLC function entity, and send the MAC PDU to a MAC PDU queue of the first mobile communication module through the interface of the first mobile communication module, wherein the MAC PDU sent by the first coordination mode management module is aggregated with the MAC PDU received by the first mobile communication module in the MAC PDU queue of the first mobile communication module.

* * * * *